US008920173B1

(12) United States Patent
Fitzgerald et al.

(10) Patent No.: US 8,920,173 B1
(45) Date of Patent: Dec. 30, 2014

(54) VEHICLE COMPARISON SYSTEM

(75) Inventors: Rebecca K. Fitzgerald, Greenfield, WI (US); Garth A. Cole, Cedarburg, WI (US); Kimberley S. Metcalf-Kupres, Vernon, WI (US); Thomas M. Watson, Milwaukee, WI (US); Craig W. Rigby, Bayside, WI (US)

(73) Assignee: Johnson Controls Technology Company, Holland, MI (US)

( * ) Notice: Subject to any disclaimer, the term of this patent is extended or adjusted under 35 U.S.C. 154(b) by 361 days.

(21) Appl. No.: 13/231,766

(22) Filed: Sep. 13, 2011

(51) Int. Cl.
*G09B 9/04* (2006.01)

(52) U.S. Cl.
USPC .......................................................... 434/62

(58) Field of Classification Search
USPC ........................... 701/51, 102, 123, 22; 477/3
See application file for complete search history.

(56) References Cited

U.S. PATENT DOCUMENTS

| | | | | |
|---|---|---|---|---|
| 7,233,855 | B1* | 6/2007 | Kidston et al. | 701/102 |
| 8,062,169 | B2* | 11/2011 | Marr et al. | 477/3 |
| 2007/0078580 | A1* | 4/2007 | Cawthorne et al. | 701/51 |
| 2007/0135988 | A1* | 6/2007 | Kidston et al. | 701/102 |
| 2008/0262712 | A1* | 10/2008 | Duty et al. | 701/123 |
| 2008/0269009 | A1* | 10/2008 | Marr et al. | 477/3 |
| 2010/0004843 | A1* | 1/2010 | Yu et al. | 701/102 |
| 2010/0138142 | A1* | 6/2010 | Pease | 701/123 |
| 2011/0144839 | A1* | 6/2011 | Pudar | 701/22 |
| 2011/0224854 | A1* | 9/2011 | Kalhous et al. | 701/22 |
| 2012/0196721 | A1* | 8/2012 | He et al. | 477/3 |
| 2013/0035839 | A1* | 2/2013 | Otanez et al. | 701/102 |
| 2013/0046449 | A1* | 2/2013 | Yucel et al. | 701/51 |
| 2013/0275295 | A1* | 10/2013 | Nesbitt | 705/39 |

OTHER PUBLICATIONS

"Comparing Resale Prices and Total Cost of Ownership for Gasoline, Hybrid and Diesel Passenger Cars and Trucks." (Aug. 2010) by Elisabeth B. Gilmore and Lester B. Lave; both at Engineering and Public Policy and Tepper Business School, Carnegie Mellon University.*
Annual Progress Report for Advanced Vehicle Technology Analysis and Evaluation Activities (U.S. Department of Energy FY 2006).*
"Comparing Resale Prices and Total Cost of Ownership for Gasoline, Hybrid and Diesel Passenger Cars and Trucks." (Aug. 2010) by Elisabeth B. Gilmore and Lester B. Lave; both at Engineering and Public Policy and Tepper Business School, Carnegie Mellon University. http://gdi.ce.cmu.edu/gd/Research/working-papers/Gilmore_Lave_Resale_Prices_August_20.*
Costlow, Terry, Software Must Monitor and Manage Many Parameters While Coordinating the Complex Operations of the Engine, Electric Motors, and Batteries, Taking Control of Hybrids, Nov. 2007, pp. 29-31; http://www.sae.org/images/enewsletter/eblast/2007/nov_aei_electronics/electronics.pdf.
Watson, Thomas M. et al., Tecent Improvements in Li/SOC12 Cell Design, Jun. 9-12, 1986, p. 1, Cherry Hill, NJ, Abstract; http://adsabs.harvard.edu/abs/1986poso.symp..498W.

* cited by examiner

*Primary Examiner* — Robert J Utama
(74) *Attorney, Agent, or Firm* — Fletcher Yoder, P.C.

(57) ABSTRACT

A system for comparing energy usage of different vehicle platforms is provided. The system may include a processor to execute routines stored in a memory device. Further, in one embodiment the routines include routines configured to receive selection of a driving style by a user and to select a virtual test drive based on the received selection. Also, the routines may include routines configured to output the selected virtual test drive and to output a comparison of multiple vehicles having different characteristics based on the selected virtual test drive. Other systems, methods, and manufactures are also disclosed.

13 Claims, 23 Drawing Sheets

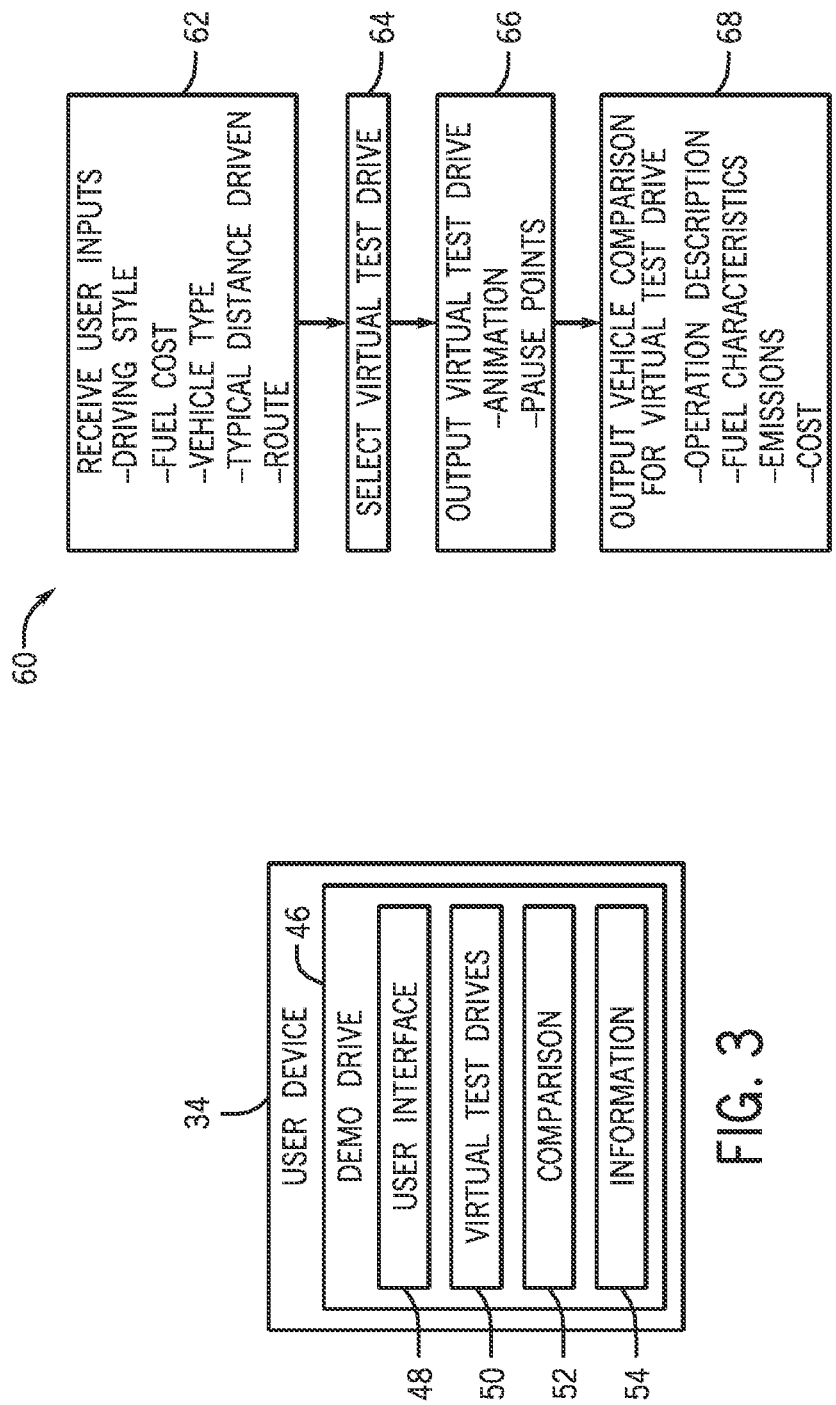

VEHICLE COMPARISON SYSTEM

BACKGROUND

This section is intended to introduce the reader to various aspects of art that may be related to various aspects of the present invention, which are described or claimed below. This discussion is believed to be helpful in providing the reader with background information to facilitate a better understanding of the various aspects of the present invention. Accordingly, it should be understood that these statements are to be read in this light and not as admissions of prior art.

Embodiments of the present disclosure relate generally to comparisons of vehicles for a user. More specifically, some embodiments of the present disclosure relate to a vehicle comparison tool allowing a user to take a virtual test drive of different vehicles.

When purchasing cars, trucks, or other vehicles, consumers often consider many factors, including cost of ownership. Advanced vehicle technologies, including start-stop functionality, hybrid vehicles, and fully electric vehicles, are becoming increasingly available in the market. And vehicles with such advanced technology may have lower fuel costs or other operating expenses compared to conventional vehicles with only an internal combustion engine. While general costs of ownership of different vehicles and fuel calculators are available to consumers, these tools may not be adequate to inform consumers of possible benefits of advanced vehicle technologies. Recent polling suggests that a large majority of driving Americans would consider buying a vehicle with such advanced technology at existing prices, but less than half know of any differences between the various advanced technologies available.

BRIEF DESCRIPTION

Certain aspects commensurate in scope with the originally claimed invention are set forth below. It should be understood that these aspects are presented merely to provide the reader with a brief summary of certain forms various embodiments of the presently disclosed subject matter might take and that these aspects are not intended to limit the scope of the invention. Indeed, the invention may encompass a variety of aspects that may not be set forth below.

Embodiments of the presently disclosed subject matter may generally relate to allowing a potential consumer to compare different vehicles. Particularly, in at least some embodiments, a vehicle comparison tool allows a user to take a virtual test drive of different vehicles, such as a conventional vehicle, a start-stop vehicle, and a hybrid vehicle. The virtual test drive may include an animation and comparison data for the different vehicles. In some embodiments, the virtual test drive may be selected based on one or more user inputs, such as a user-selected driving style.

Various refinements of the features noted above may exist in relation to various aspects of the subject matter described herein. Further features may also be incorporated in these various aspects as well. These refinements and additional features may exist individually or in any combination. For instance, various features discussed below in relation to one or more of the illustrated embodiments may be incorporated into any of the described embodiments of the present disclosure alone or in any combination. Again, the brief summary presented above is intended only to familiarize the reader with certain aspects and contexts of the subject matter disclosed herein without limitation to the claimed subject matter.

DRAWINGS

These and other features, aspects, and advantages of the present invention will become better understood when the following detailed description is read with reference to the accompanying drawings in which like characters represent like parts throughout the drawings, wherein:

FIG. 3 illustrates a representation of a user device storing a vehicle comparison tool in accordance with one embodiment;

FIG. 4 represents a method of operating a vehicle comparison tool in accordance with one embodiment.

DETAILED DESCRIPTION

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. When introducing elements of various embodiments of the present techniques, the articles "a," "an," "the," and "said" are intended to mean that there are one or more of the elements. The terms "comprising," "including," and "having" are intended to be inclusive and mean that there may be additional elements other than the listed elements.

Generally, the presently disclosed embodiments are directed to comparing operating characteristics of different vehicles. More specifically, a user may take a virtual test drive of the different vehicles and receive comparative information about the vehicles. While additional details about the virtual test drive and comparisons are provided in greater detail below, it is first noted that the presently disclosed functionality may be enabled by various processor-based devices.

Figure 1:
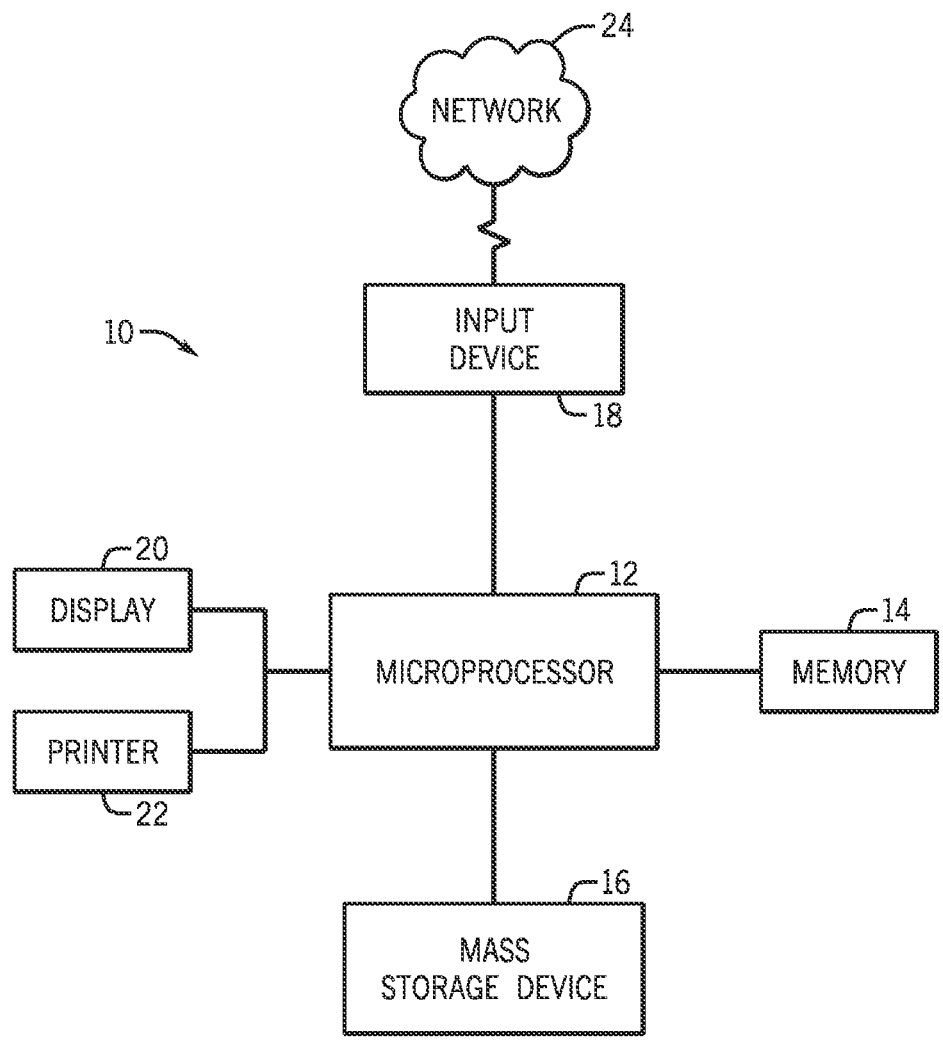
FIG. 1 is a block diagram of a processor-based device that may employ the presently disclosed vehicle comparison tool in accordance with one embodiment.

Accordingly, turning now to the drawings and referring initially to FIG. 1, a processor-based system 10 that may be used in conjunction with the subject matter described herein is depicted. The processor-based system 10 may be a general-purpose computer, such as a personal computer, configured to run a variety of software, including software implementing all or part of the functionality described herein. Alternatively, the processor-based system 10 may include, among other things, a mainframe computer, a distributed computing system, a server, or an application-specific computer or workstation configured to implement all or part of the presently disclosed functionality based on specialized software or hardware provided as part of the system. Further, the processor-based system 10 may include either a single processor or a plurality of processors to facilitate implementation of the presently disclosed functionality.

In general, the processor-based system 10 may include a microcontroller or microprocessor 12, such as a central processing unit (CPU), which may execute various routines and processing functions of the system 10. For example, the microprocessor 12 may execute various operating system instructions as well as software instructions (also referred to herein as routines) configured to effect certain processes. Such instructions may be stored in or provided by a manufacture including a computer readable-medium, such as a memory 14 (e.g., a random access memory (RAM)) or one or more mass storage devices 16 (e.g., an internal or external hard drive; flash memory or another solid-state storage device; an optical disc, such as a CD-ROM or DVD; a magnetic disc; or some other storage device). In addition, the microprocessor 12 processes data provided as inputs for various routines or software programs, such as data provided as part of the present techniques. Such data may be stored in, or provided by, the memory 14 or mass storage device 16. Alternatively, such data may be provided to the microprocessor 12 via one or more input devices 18.

The input devices 18 may include manual input devices, such as a keyboard, a mouse, a touchscreen interface, or the like. In addition, the input devices 18 may include a network device or adapter, such as a wired or wireless Ethernet card, a wireless network adapter, or any of various ports or devices configured to facilitate communication with other devices via any suitable communications network 24, such as a local area network or the Internet. Through such a network device, the system 10 may exchange data and communicate with other networked electronic systems (e.g., other processor-based systems), whether proximate to or remote from the system 10. The network 24 may include various components that facilitate communication, including switches, routers, servers or other computers, network adapters, communications cables, and so forth.

Results generated by the microprocessor 12, such as the results obtained by processing data in accordance with one or more stored routines, may be provided to an operator via one or more output devices, such as a display 20 or a printer 22. Based on the displayed or printed output, an operator may request additional or alternative processing or provide additional or alternative data, such as via the input device 18. Communication between the various components of the processor-based system 10 may typically be accomplished via a chipset and one or more buses or interconnects which electrically connect the components of the system 10.

Figure 2:
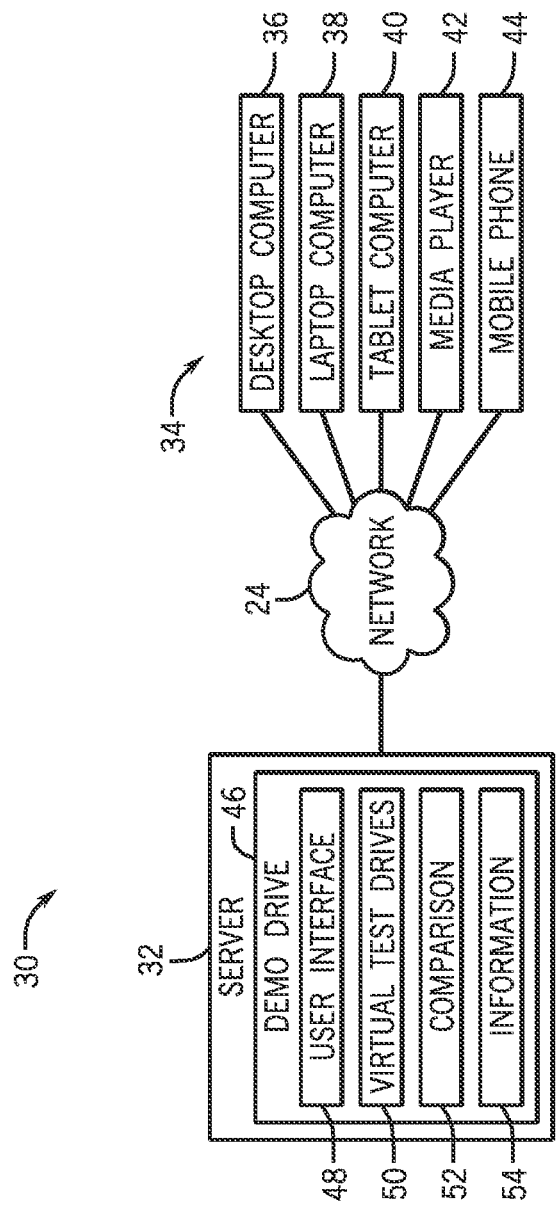
FIG. 2 is a block diagram of a plurality of user devices that may access the vehicle comparison tool from a server via a network in accordance with one embodiment.

A networked system 30 is depicted in FIG. 2 in accordance with one embodiment. The system 30 includes a server 32 to which multiple user devices 34 may connect via the network 24. The network 24 may include one or more local area networks, wide area networks, and so forth. For instance, in one embodiment the network 24 includes the Internet.

In the presently depicted embodiment, the user devices 34 include a desktop computer 36, a laptop computer 38, a tablet computer 40, a media player 42, and a mobile phone 44. The server 32 and the user devices 34 may include hardware components similar to, or identical to, the processor-based system 10 discussed above, but may take other forms in full accordance with the present technique. Additionally, various software routines and data may be stored in memories (e.g., a memory 14 or mass storage device 16) of such devices.

For instance, in FIG. 2, the server 32 may include a stored vehicle comparison tool 46, which may also be referred to as the "Demo Drive" tool. The vehicle comparison tool 46 includes various executable routines and data that facilitate user interaction and comparison of vehicles with different characteristics. In one embodiment, the vehicle comparison tool 46 includes various routines and data, such as a user interface module 48, a virtual test drive module 50, a comparison module 52, and an information module 54. The user devices 34 may access the vehicle comparison tool 46 via the network 24. For example, in one embodiment the vehicle comparison tool 46 may be provided through a website hosted by the server 32 and accessible by the user devices 34 over the Internet via any suitable web browser. But in other embodiments the vehicle comparison tool 46 may be accessed in other ways, such as being stored as an application and executed in a user device 34, as generally depicted in FIG. 3 in accordance with another embodiment. Also, the vehicle comparison tool 46 may be implemented through any suitable programming technology, such as JAVA™ from Oracle Corp. or the Adobe Flash Platform from Adobe Systems Inc.

Whether it is stored in the server 32 or a user device 34, a user may access the vehicle comparison tool 46 to take a virtual test drive and compare different vehicles. For example, in one embodiment the vehicle comparison tool 46 may be operated according to a method generally represented by the flowchart 60 of FIG. 4. Through interaction with the vehicle comparison tool 46, a user may input various parameters such that the vehicle comparison tool 46 may select or tailor a virtual test drive and vehicle comparisons for that user. The vehicle comparison tool 46 may receive from the user (block 62) information such as a driving style, estimated fuel costs, a vehicle type (e.g., make, model, size, class, etc.), distance typically driven by the user (e.g., per trip, daily, weekly, monthly, or yearly), or a route of interest to the user.

Based on the user's input, the vehicle comparison tool 46 may select a virtual test drive (block 64) for the user. In one embodiment, the virtual test drive may be selected based on the user-selected driving style alone, and may be selected from multiple, stored, virtual test drives each associated with a particular driving style. But in other embodiments, the virtual test drive may be selected based on other or additional parameters (e.g., vehicle type or distance driven), or may include creating a new virtual test drive based on the user input (e.g., a user-selected route or vehicle type).

The vehicle comparison tool 46 may also output the virtual test drive (block 66), which may be viewed by a user on a display of a user device 34. When accessed via a server 32, the virtual test drive may be output through a webpage. As described in greater detail below, the virtual test drive may include an animation of a vehicle traveling along a virtual route. As also discussed below, the animation may include one or more "pause points" to give a user time to stop and read information comparing different vehicles (including vehicles identical except for different powertrains) of the virtual test drive.

The method of FIG. 4 also includes outputting the vehicle comparison information for the virtual test drive (block 68). The output information may include, but is not limited to, a real-time description or comparison of the operation of various vehicles simultaneous with the output of the virtual test drive. And the real-time comparison information may be selected from a plurality of such information based on the selected driving style or virtual test drive. In one embodiment, the different vehicles include a conventional vehicle driven by a internal combustion engine, a start-stop vehicle driven by a internal combustion engine and having start-stop technology (in which the vehicle includes regenerative braking and can turn on and off the engine for more efficient operation), and a hybrid driven by both an internal combustion engine and an electric motor powered by a battery. The comparison information may include fuel characteristics, emissions, and costs associated with each of the various powertrains. Other vehicles may be compared in additional embodiments, such as embodiments comparing cars to trucks, small cars to large cars, or one particular vehicle to one or more other particular vehicles.

Figure 5:
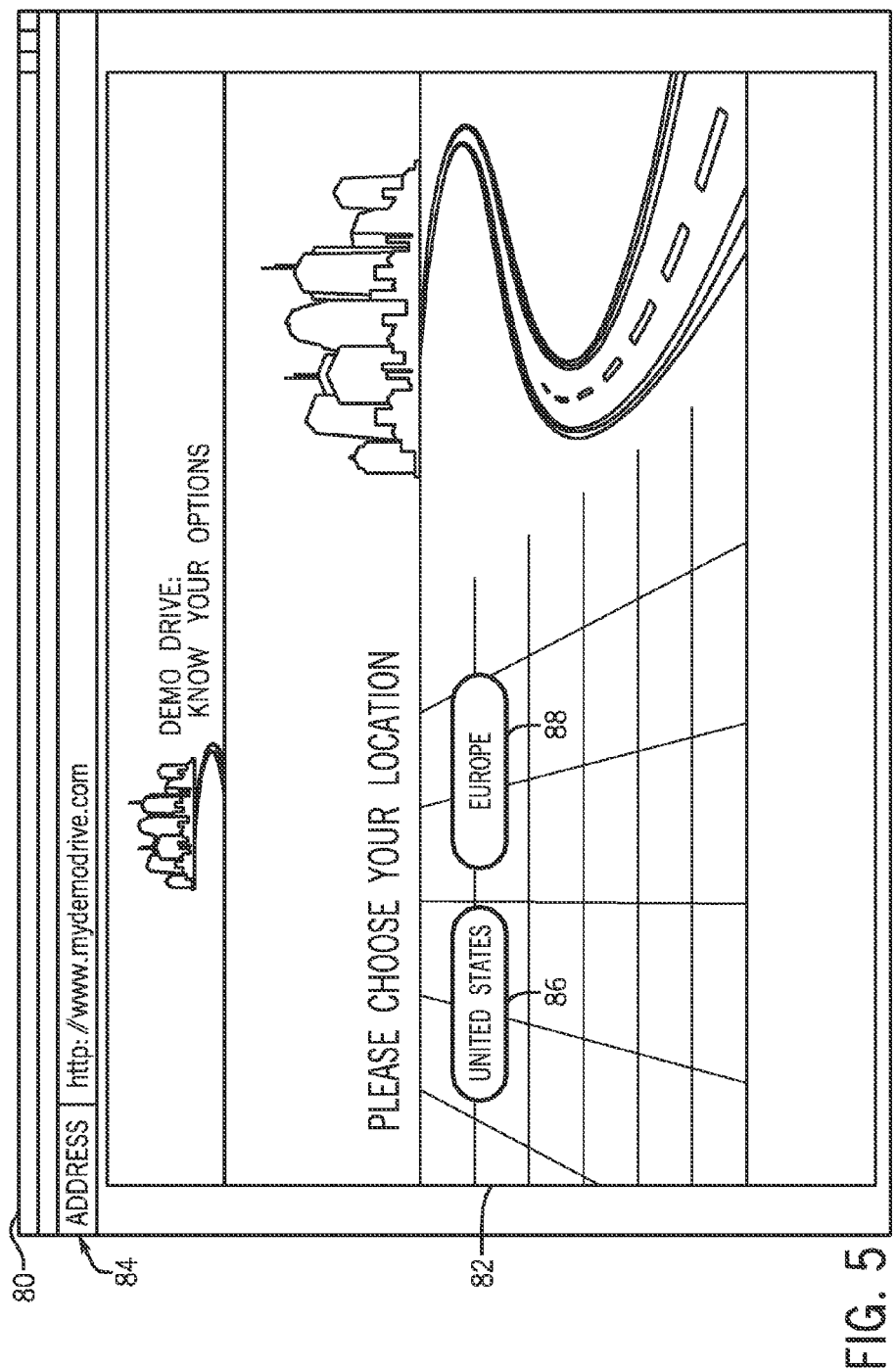
FIGS. 5-24 depict various user-viewable pages that may be produced by a vehicle comparison tool in accordance with one embodiment to facilitate user understanding and comparison of different vehicle drive technologies.

FIGS. 5-24 depict a series of user-viewable pages demonstrating operation of a vehicle comparison tool 46 in accordance with one embodiment. In an embodiment in which the vehicle comparison tool 46 is accessed from a server via the Internet, a web browser window 80 may be used to display the series of user-viewable pages (e.g., web pages), such as page 82 in FIG. 5. A user may navigate to the page 82 by typing in an appropriate address (e.g., www.mydemodrive.com) in an address line 84 of the browser window 80. But as noted above, in other embodiments the vehicle comparison tool 46 may be accessible in other ways. For example, the vehicle comparison tool 46 may be stored as an application on a user device 34, such as a personal computer or a mobile phone. The page 82 may request the user's location, which may be used by the vehicle comparison tool 46 to customize the user experience based on the selected region (e.g., metric vs. standard measurements and unit of currency). In the presently illustrated embodiment, the page 82 allows a user to select their location as either the United States or Europe using buttons 86 or 88. These buttons, as well as others described herein, may be selected in any appropriate manner. For example, a computer mouse may be used to move a pointer over and select a button, or a user may touch the button to select it if the button is rendered on a touchscreen display. Although page 82 provides only buttons 86 and 88 to select either the United States or Europe as the user location, other embodiments may include buttons for any number of other locations.

Figure 6:
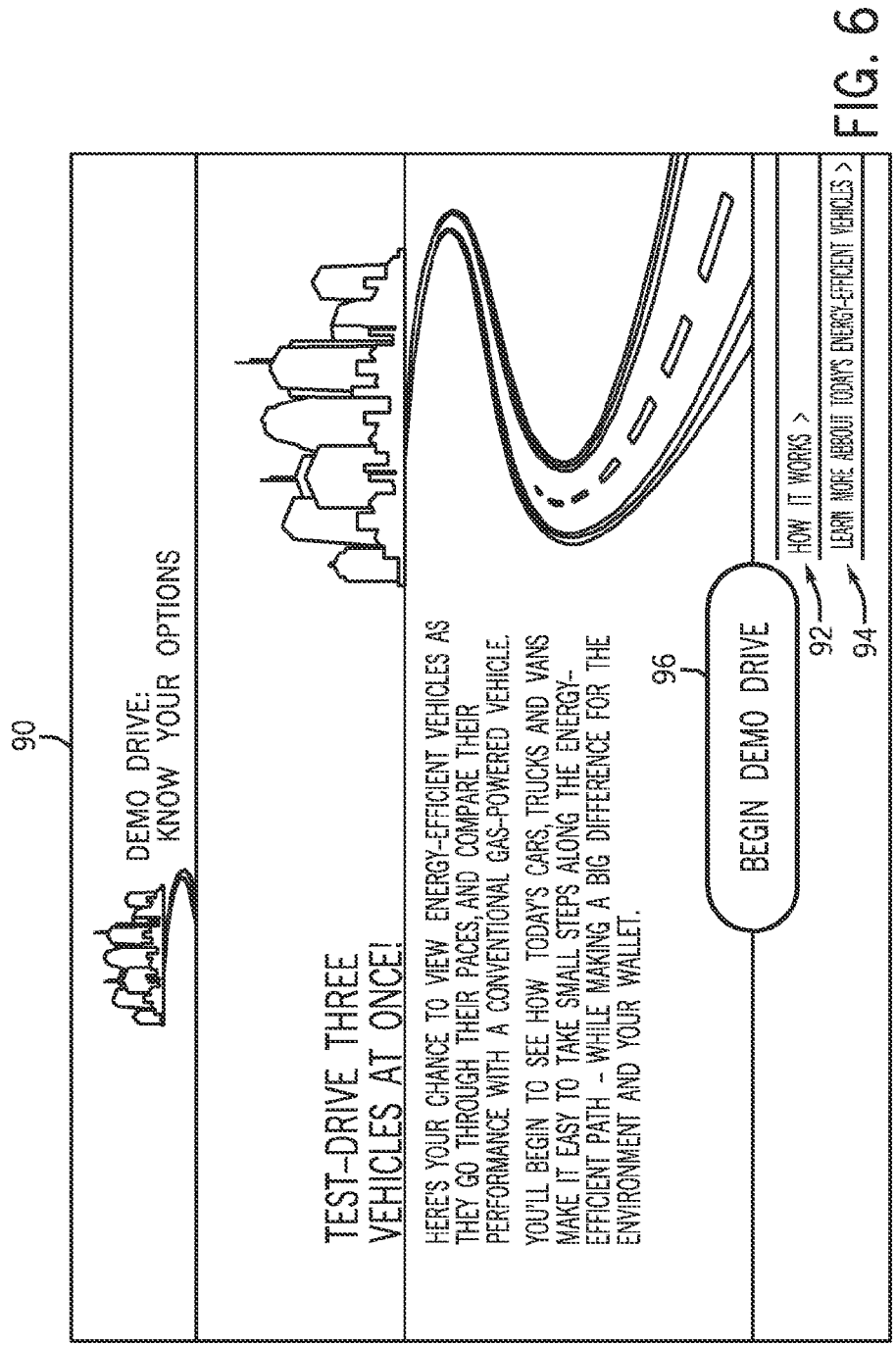
Figure 7:
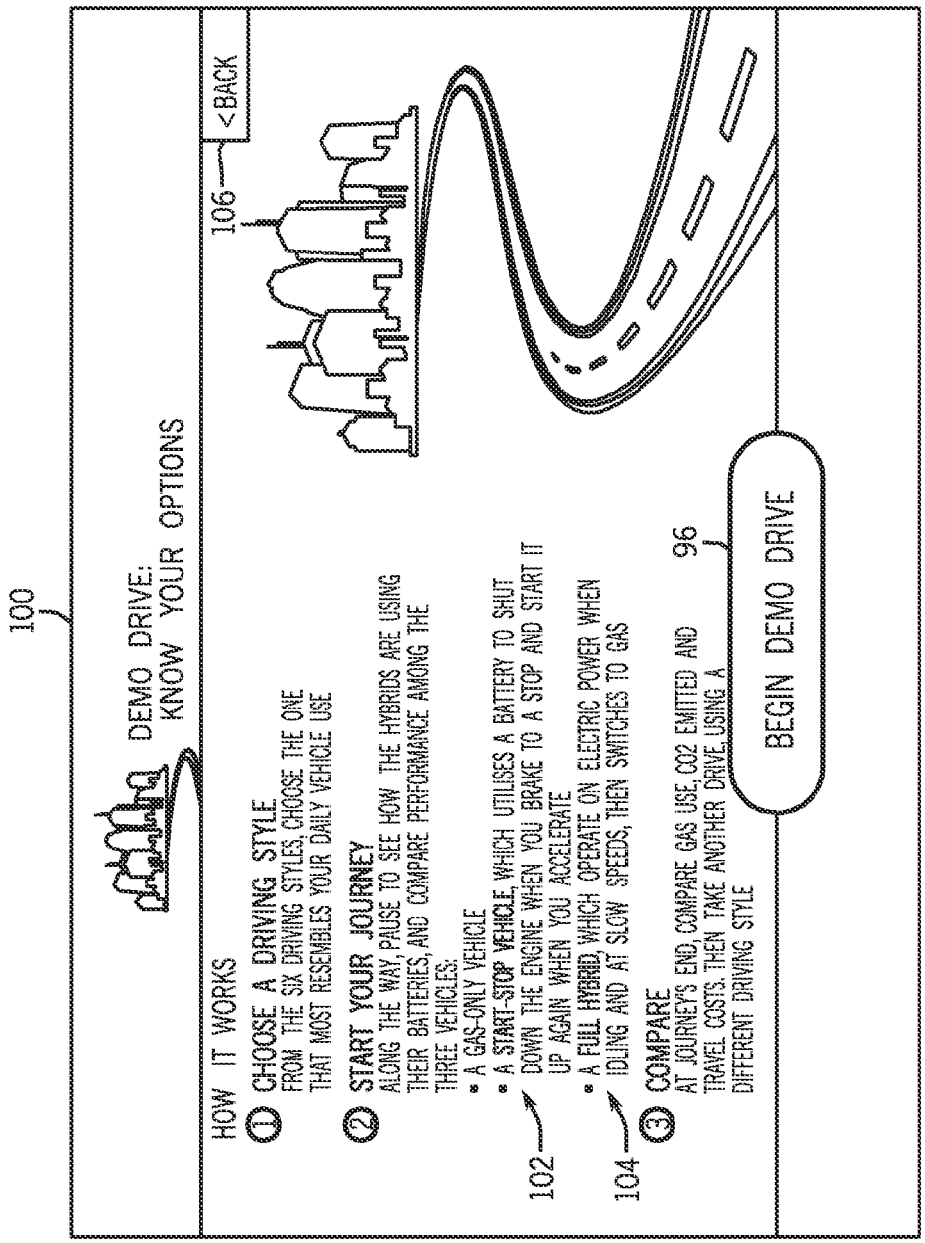

In response to user selection of the location, the vehicle comparison tool 46 may output a page 90 as depicted in FIG. 6. This page may include introductory text, links 92 and 94 to other pages, and a button 96 to begin a virtual test drive (i.e., Demo Drive). User selection of link 92 causes the vehicle comparison tool 46 to output page 100 (FIG. 7) describing steps in the virtual test drive. As noted in page 100, the virtual test drive may include selection of a driving style by the user, comparison of various vehicles (i.e., a conventional, gas-only vehicle; a start-stop vehicle; and a full hybrid in the present embodiment) during a virtual test drive, and a final comparison of the vehicles. The page 100 may include further links, such as links 102 and 104, to other pages. Also, the page 100 (as well as other pages) may include the button 96 to begin the virtual test drive and a button 106 to return to a previous page.

Figure 8:
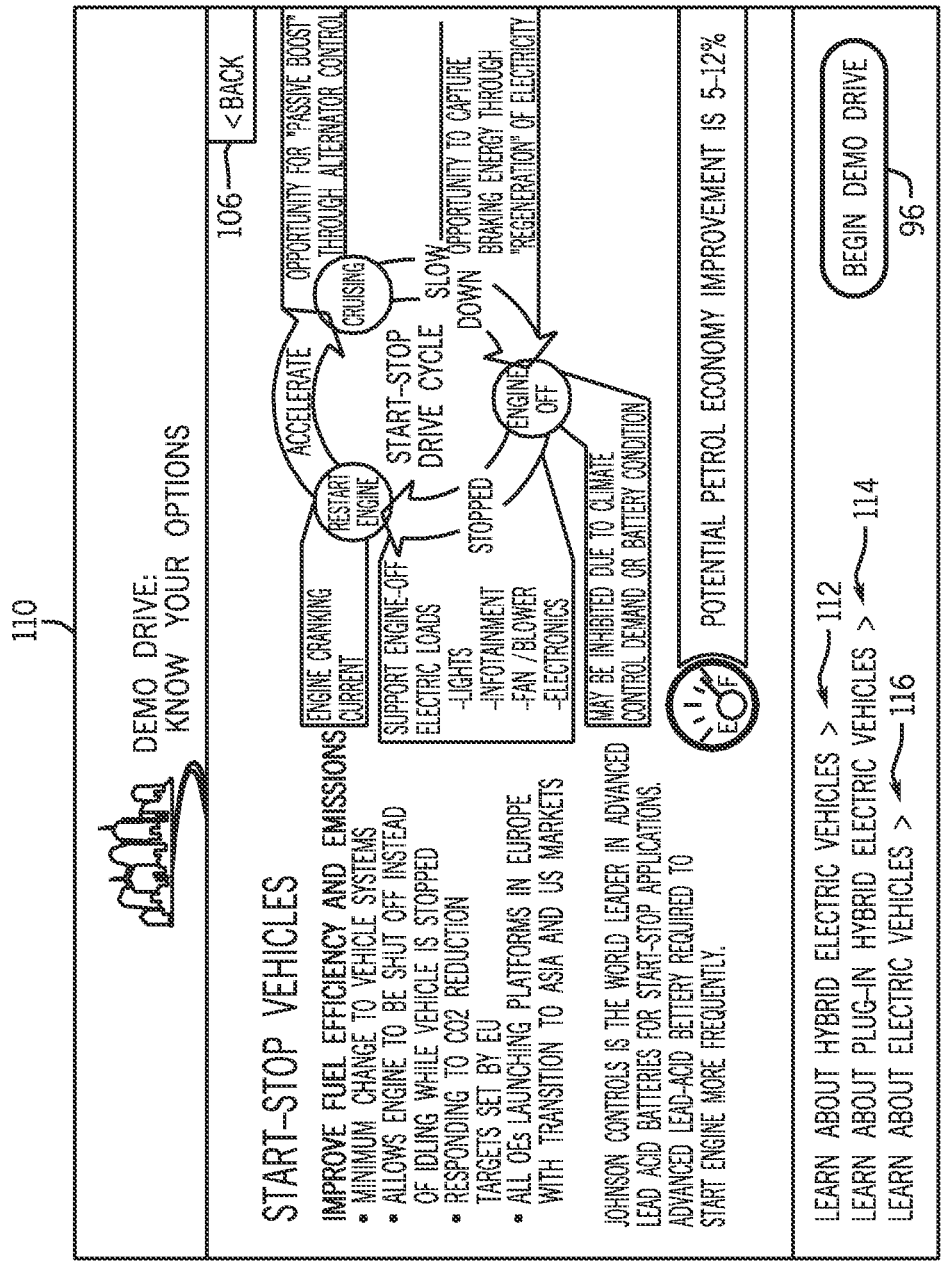
Figure 9:
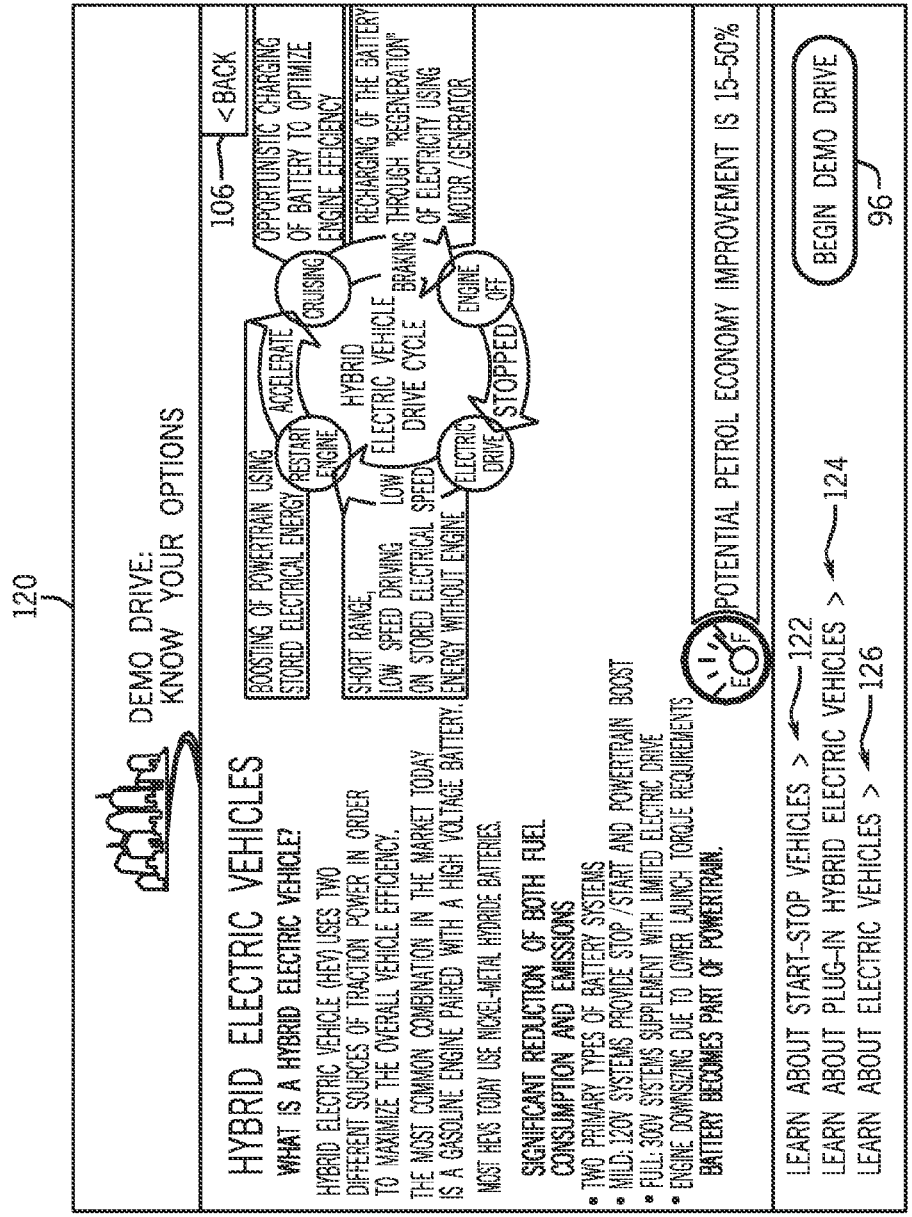
Figure 10:
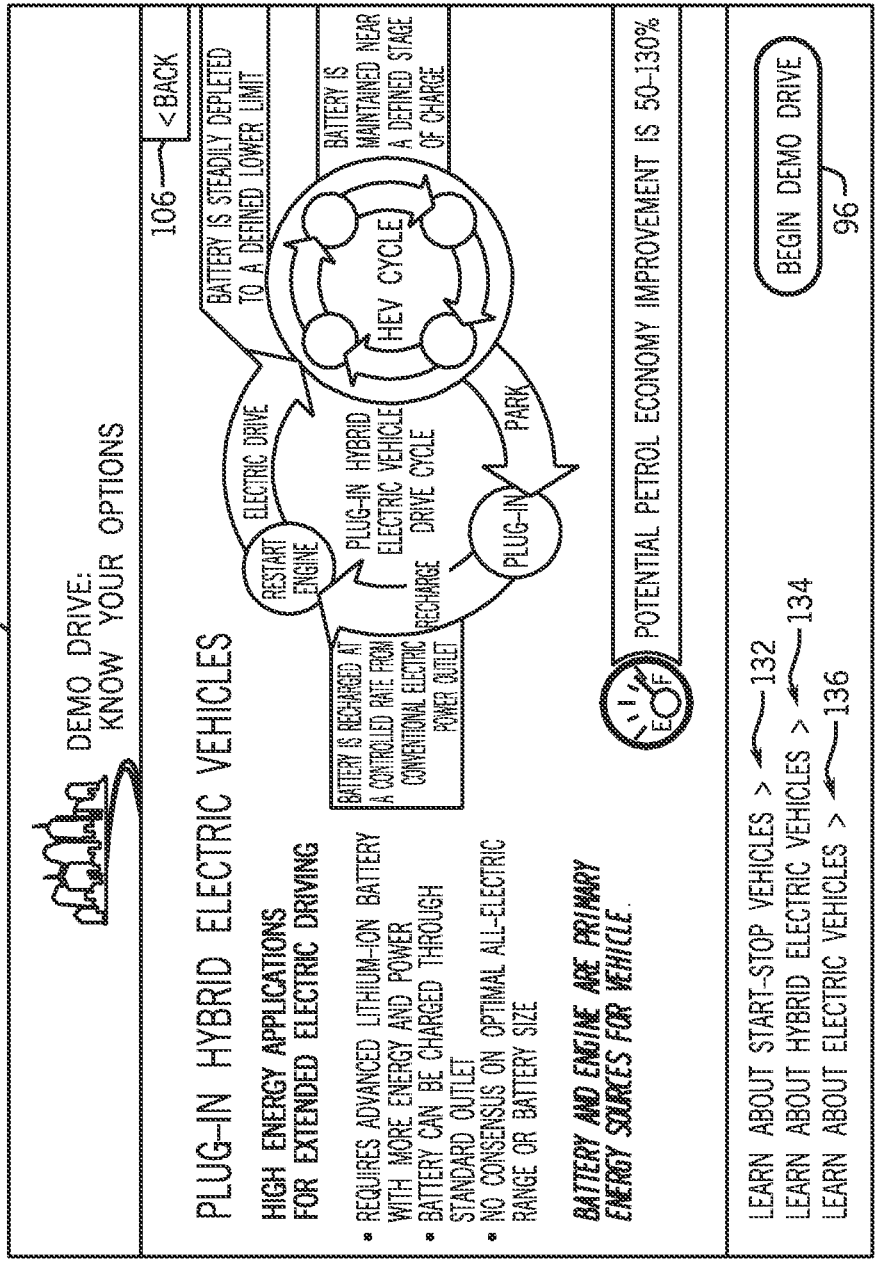
Figure 11:
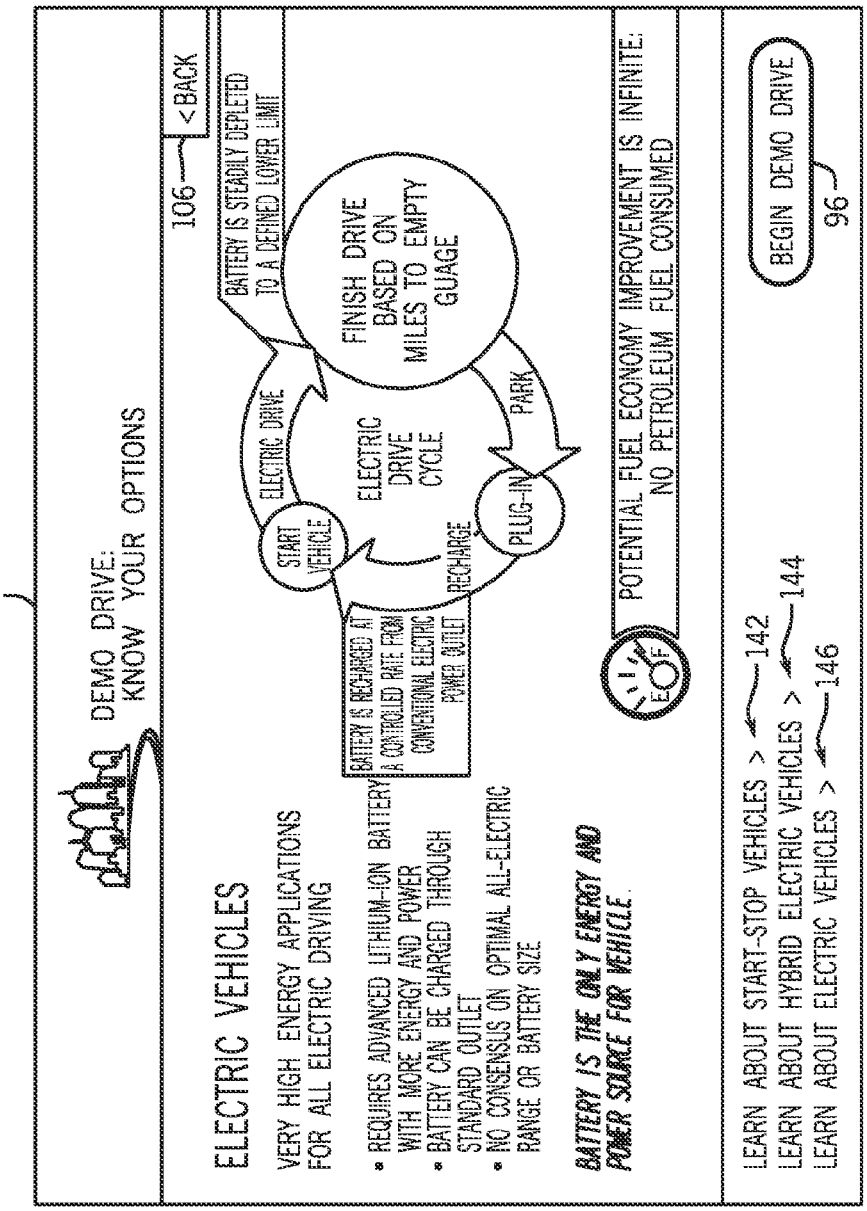

By selecting links 102 and 104, a user may navigate to pages 110 and 120 of FIGS. 8 and 9. Page 110 includes additional information about start-stop vehicles and page 120 provides additional information about hybrid electric vehicles. A user may navigate to additional pages by selecting links 112, 114, and 116 from page 110, or by selecting links 122, 124, and 126 from page 120. Selection of either link 114 or 124 will lead to page 130 (FIG. 10), which provides information on plug-in hybrid electric vehicles. The page 130 may include additional links 132, 134, and 136 to navigate to other pages. Likewise, selection of links 116, 126, or 136 from pages 110, 120, or 130 results in output of page 140 as depicted in FIG. 11. Page 140 provides additional information on fully electric vehicles, and includes links 142, 144, and 146 to navigate to previously described pages.

Figure 12:
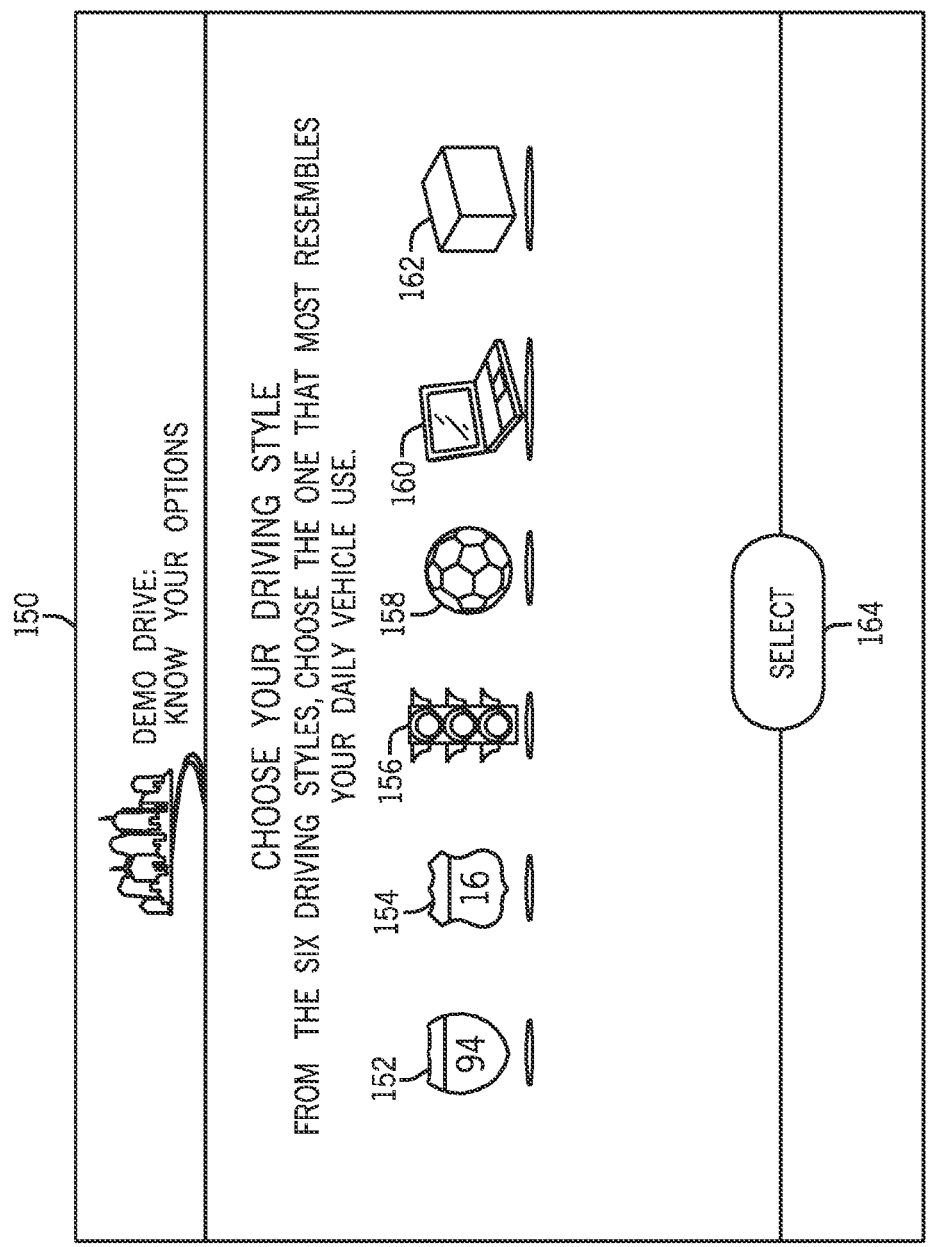

From any of the preceding pages, a user may select the begin demo drive button 96 to navigate to page 150 of FIG. 12. This page asks the user to choose a driving style for the virtual test drive by selecting one of the icons 152, 154, 156, 158, 160, and 162, and confirming the selection by activating (e.g., clicking or touching) a select button 164. Like the buttons of the pages, the icons may be selected in any suitable manner, such as through use of a computer mouse or a touchscreen interface.

Figure 13:
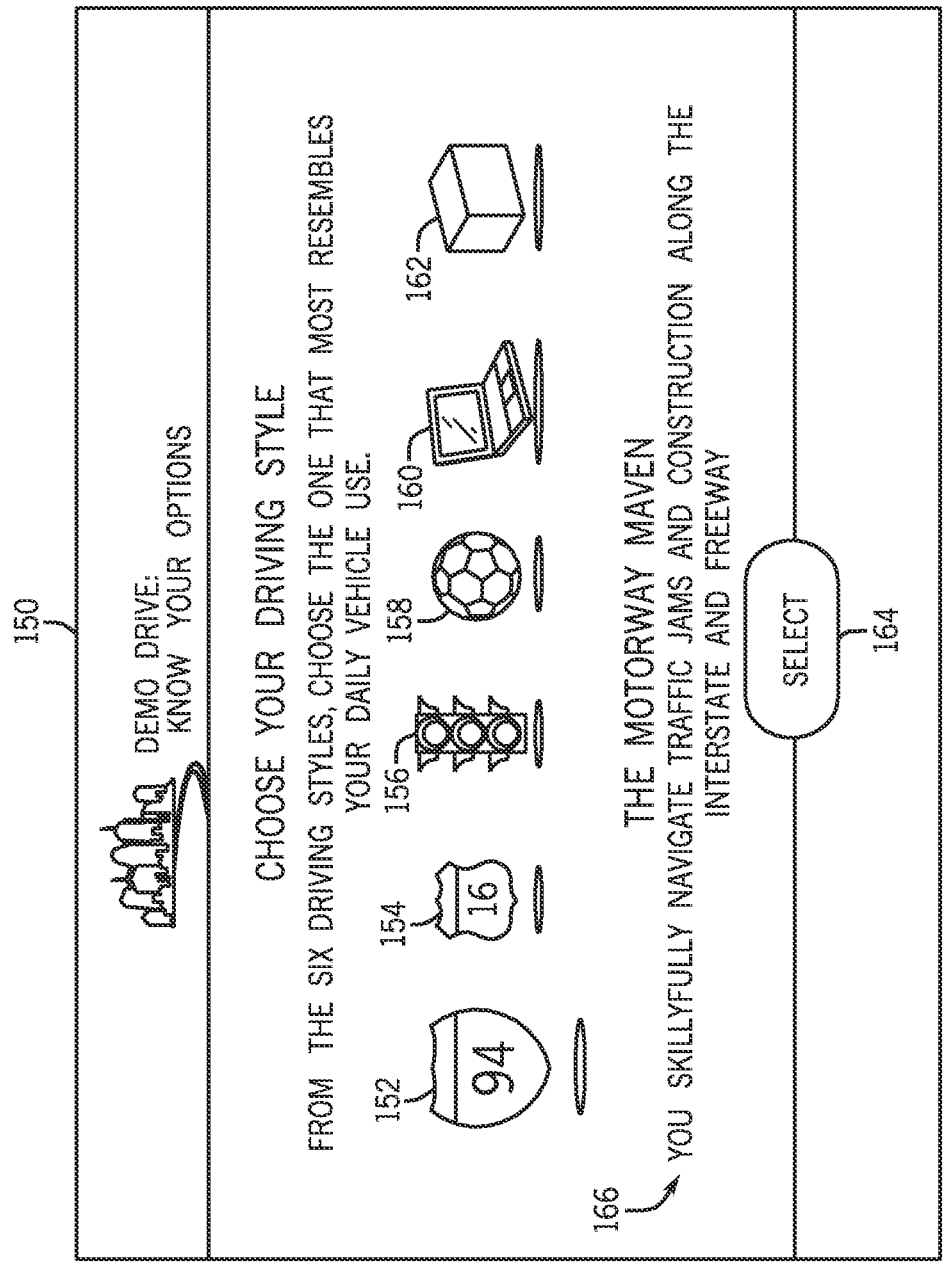

In the present embodiment, initial selection of one of the icons, such as icon 152, may cause the icon to enlarge and the page 150 may provide a description 166 of the associated driving style, as depicted in FIG. 13. As illustrated in this figure, the icon 152 may be associated with a driving style titled "The Motorway Maven" in which the user navigates traffic jams and construction along the interstate and freeway. In the present embodiment, the other selectable driving styles may include "The Countryside Commuter" that heads for the horizon along suburban roadways and highways (icon 154); "The Urbanite" for users that frequently travel on city streets (icon 156); "The Chauffeur" for users frequently shuttling kids to school, activities, and sports (icon 158); "The Mobile Marketer" that travels to sell products and services (icon 160); and "The Delivery Driver" whose routes typically include frequent stopping to make deliveries. Although these driving styles are provided by way of example, any other driving styles may be used in addition to or instead of those described above.

Figure 14:
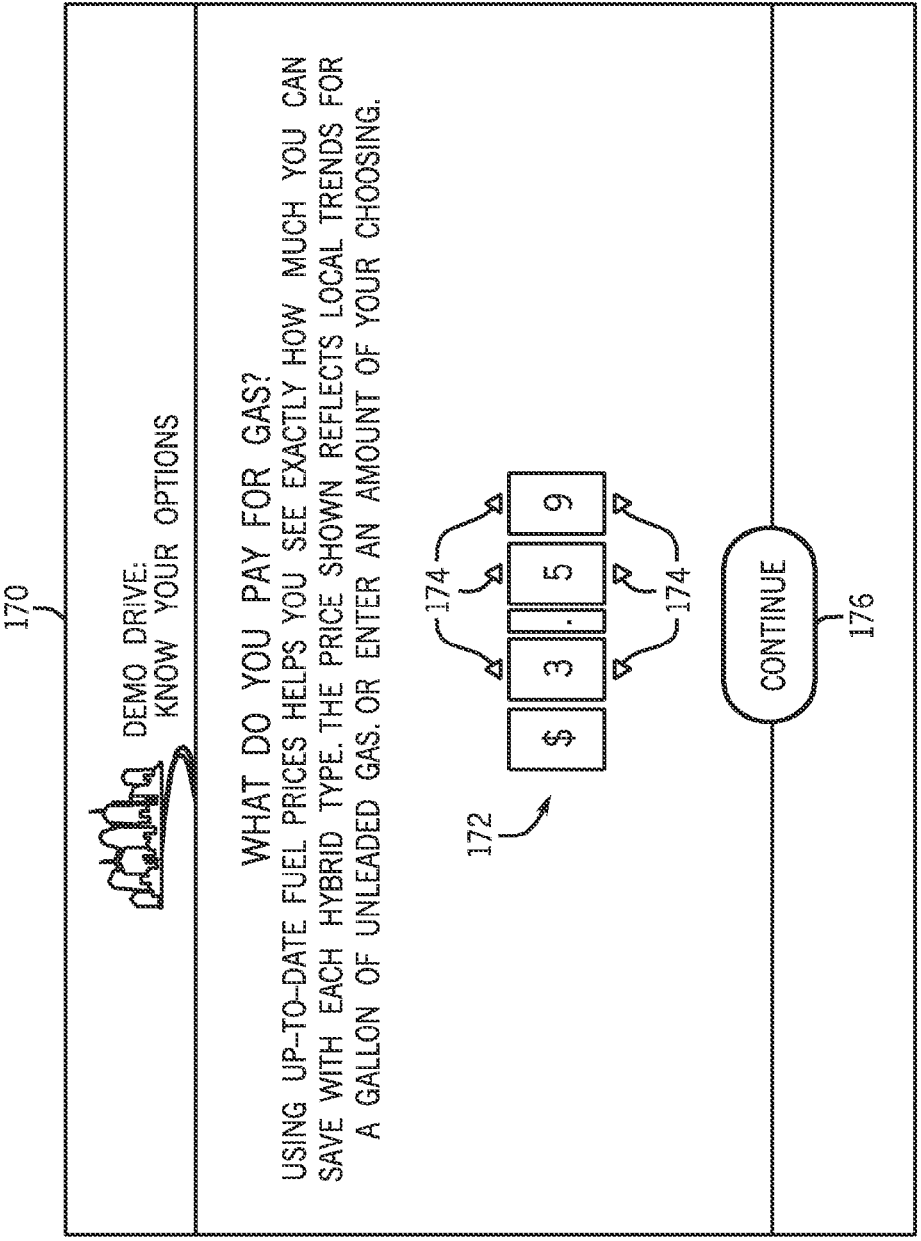

Upon selecting one of the icons and clicking (or touching) the button 164, the vehicle comparison tool 46 proceeds to output a page 170 as depicted in FIG. 14. Generally, page 170 asks the user to select a price that the user pays for a gallon of fuel. In the present embodiment, the price is displayed in fields 172 and may be manipulated through user interaction with the buttons 174. Of course, for other regions, the page 170 may instead ask how much a user pays per liter (or other unit of measurement) of fuel and the price may be input in other currencies (e.g., Euros). A user may then select a button 176 to continue to page 180 of FIG. 15 and to commence the virtual test drive.

As noted above, the virtual test drive may include an animation of a vehicle traveling on various roadways (e.g., highways, city streets, and rural roads) based on user input, such as selection of the driving style. As also noted above, the animation may include a series of pause points in which the animation is paused in order to allow a user to read information comparing vehicles for the animated virtual test drive. Examples of information that may be conveyed to a user during the virtual test drive are provided in FIGS. 15-23, which generally depict pause points during the animation of the virtual test drive. Particularly, in the presently illustrated embodiment, page 180 includes a region 182 for providing information about the virtual test drive to a user. For example, the region 182 may include text indicating the selected driving style, the trip distance of the virtual test drive, and a running narrative describing movement of the vehicle during the virtual test drive.

It is noted that each driving style may be associated with its own trip distance and narrative. For example, the virtual test drive for "The Motorway Maven" may include traveling to a highway; accelerating onto the highway; driving down the highway at normal operating speeds; encountering rush hour traffic in which the vehicle continually idles, accelerates, and brakes; exiting the highway; and traveling city streets to a parking lot. In contrast, the virtual test drive for the "The Countryside Commuter" will differ from that of "The Motorway Maven." For example, the virtual test drive for "The Countryside Commuter" may not include encountering rush hour traffic and may include fewer stops for lights and such.

Likewise, the virtual test drives for other driving styles may include different parameters, routes, and operation. By way of further example, the virtual test drive for "The Delivery Driver" may include no, or limited, highway driving along with frequent stops at stop lights and at addresses (e.g., for deliveries). Additionally, the distances of segments of routes, the number of stops, the speeds, the rates of acceleration, and many other parameters may differ between the virtual test drives for the different driving styles, all of which may impact the comparisons provided by the vehicle comparison tool 46.

In one embodiment, the appropriate animation 184 is selected by the vehicle comparison tool 46 from multiple animations based on user input (e.g., the selected driving style or other input) and is provided in page 180. Further, the page 180 may include a region 186 that includes a comparison of different vehicles for the virtual test drive. In the presently illustrated embodiment, these different vehicles include a conventional vehicle, a start-stop vehicle, and a hybrid vehicle. These different vehicles may be generally represented in the animation 184 by a vehicle 188, which travels on roadways 190.

Figure 15:
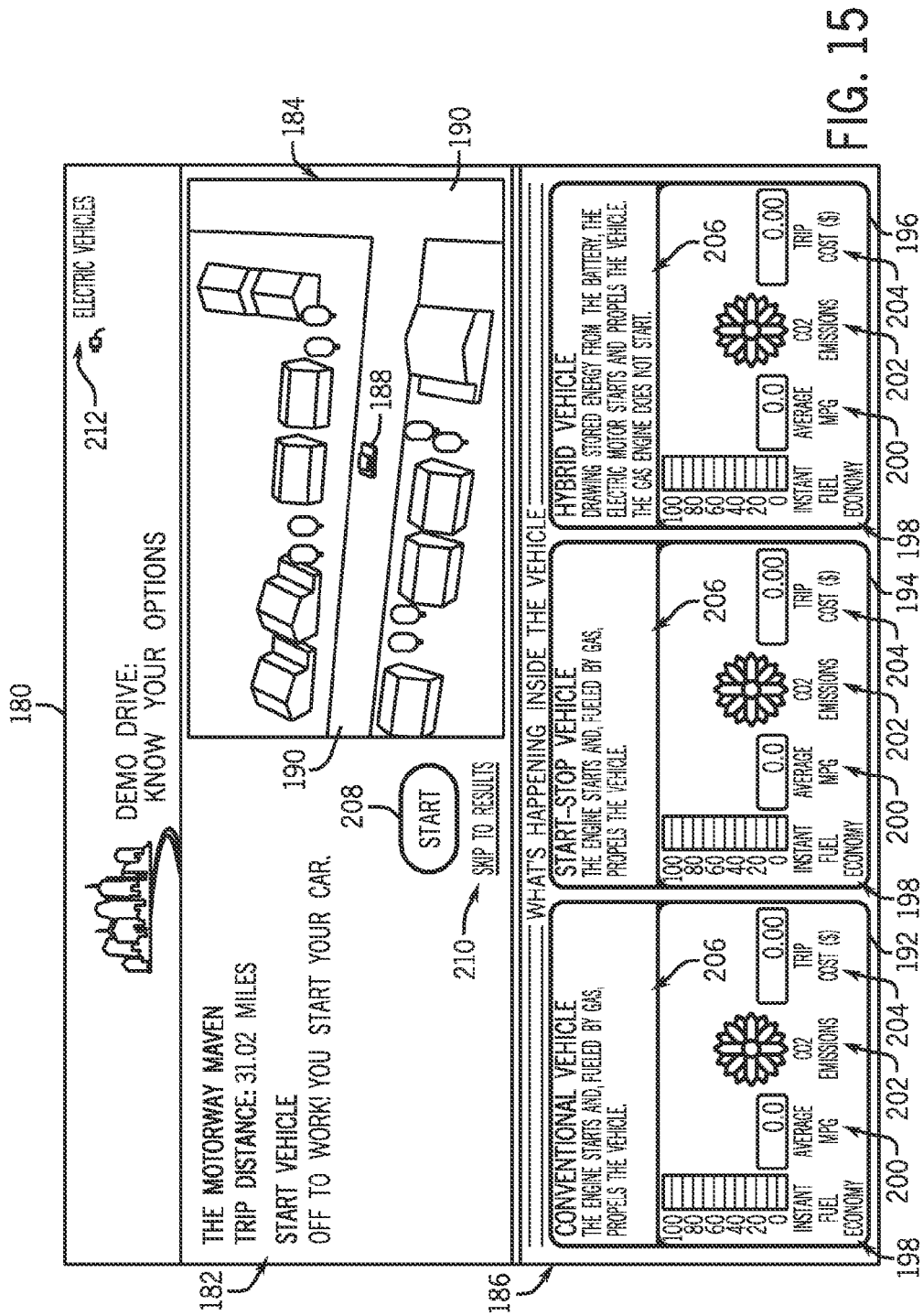

Statistics for each of the different vehicles represented by the vehicle 188 in the animation 184 may be presented in panels 192, 194, and 196. These statistics may include instant fuel economy 198, average miles per gallon 200, carbon dioxide emission 202, and trip cost 204 for the virtual test drive for each of the different vehicles. The panels 192, 194, and 196 may also include text areas 206 to contemporaneously provide a description of operation of each vehicle during the virtual test drive (i.e., during the animation 184). For example, the text areas 206 provide a description of operation of the different vehicles consistent with the narrative provided in region 182 and the animation 184. In FIG. 15, the text area 206 describes the initial start up and movement of the vehicles. As depicted, the text areas 206 of the panels 192 and 194 indicate that the engines of the vehicles start and, fueled by gas, propel the vehicles. In contrast, the text area 206 of panel 196 notes that the battery of the hybrid vehicle is used to power an electric motor that propels the vehicle without starting a gas engine or consuming fuel.

Figure 16:
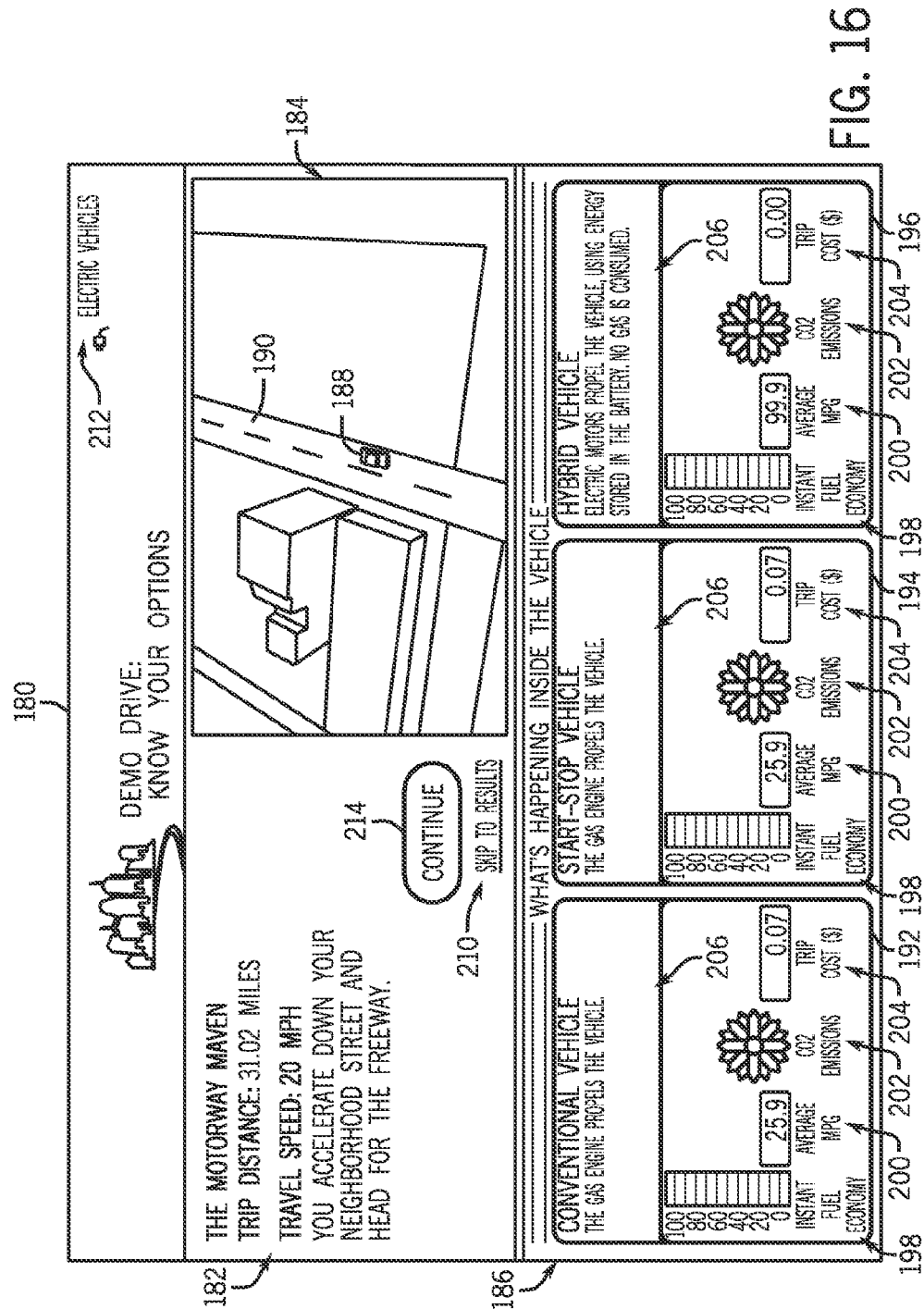

A user may start the animation 184 by selecting the start button 208 or may skip the animation 184 by selecting the link 210 to skip ahead to the results of the virtual test drive. Also, the user may select link 212 to return to informational pages, such as those described previously. Upon selecting the start button 208, the animation 184 will play and depict the vehicle 188 navigating roads 190 until the animation reaches another pause point generally depicted in FIG. 16. During playback of the animation 184, the narrative in region 182 describes the events depicted in the animation 184, while region 186 simultaneously provides information about operation of the different vehicles represented by the vehicle 188 in the animation 184. In FIG. 16, the narrative in region 182 describes the animation 184 up to the pause point represented in FIG. 16. In other words, up to the point depicted in FIG. 16, the vehicle 188 has accelerated down a neighborhood street and headed for the freeway with a travel speed (average or median) of twenty miles per hour. The user may continue the animation by selecting the button 214.

Figure 17:
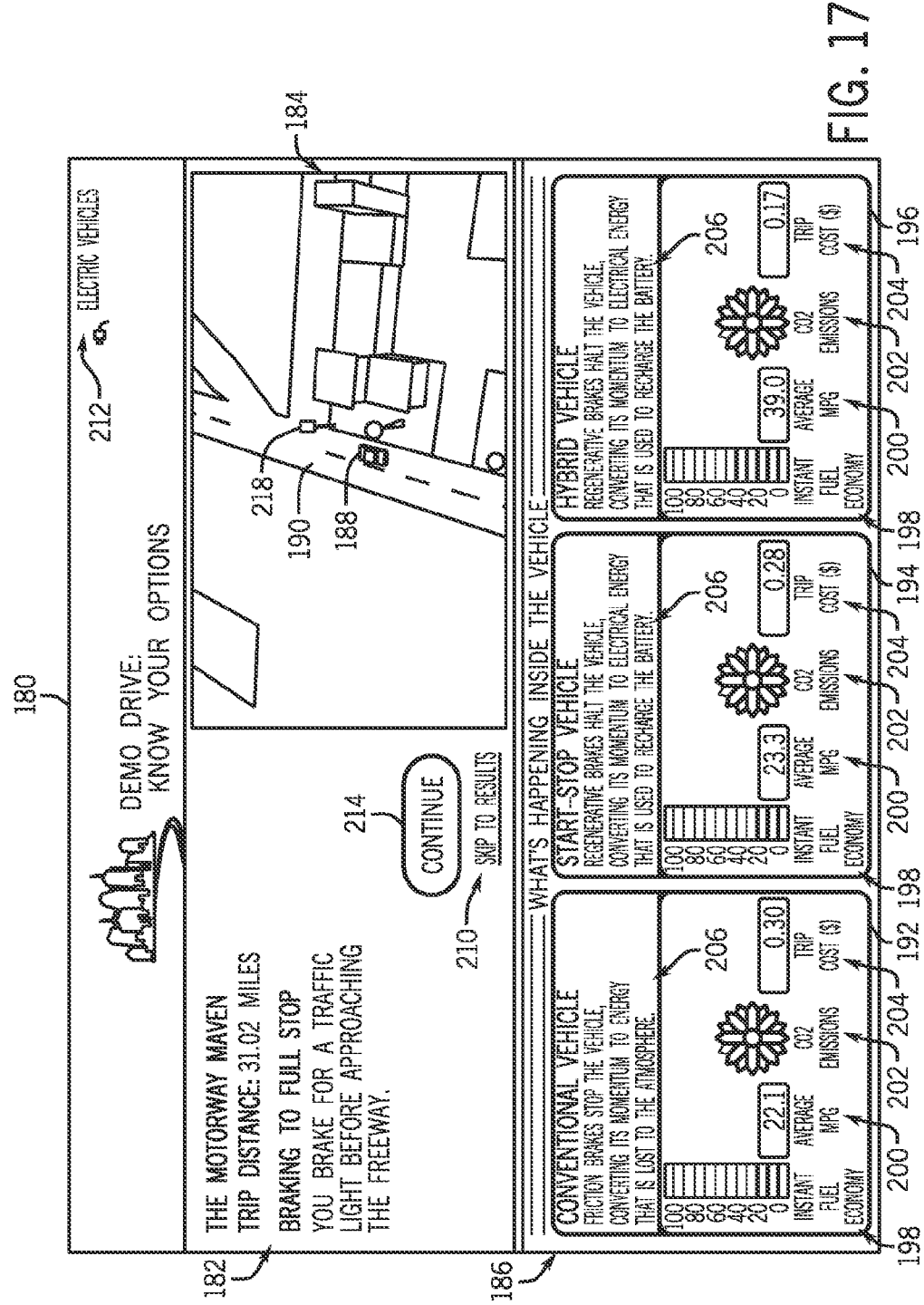

Next, the animation 184 proceeds to depict the vehicle 188 traveling and then braking to a full stop at a traffic light 218 before the animation 184 pauses again, as represented in FIG. 17. During the animation 184 between the pause points represented by FIGS. 16 and 17, during the pause point represented by FIG. 17, or during both, the text areas 206 describe differences between the conventional vehicle, the start-stop vehicle, and the hybrid vehicle. Particularly, as may be seen from FIG. 17, text area 206 of panel 192 notes that in a conventional vehicle friction brakes stop the vehicle and convert its momentum to energy that is lost to the atmosphere. In contrast, the text areas 206 of the panels 194 and 196 provide that the start-stop vehicle and the hybrid vehicle each include regenerative brakes that halt the vehicle and convert its momentum to electrical energy that is used to recharge the battery.

Figure 18:
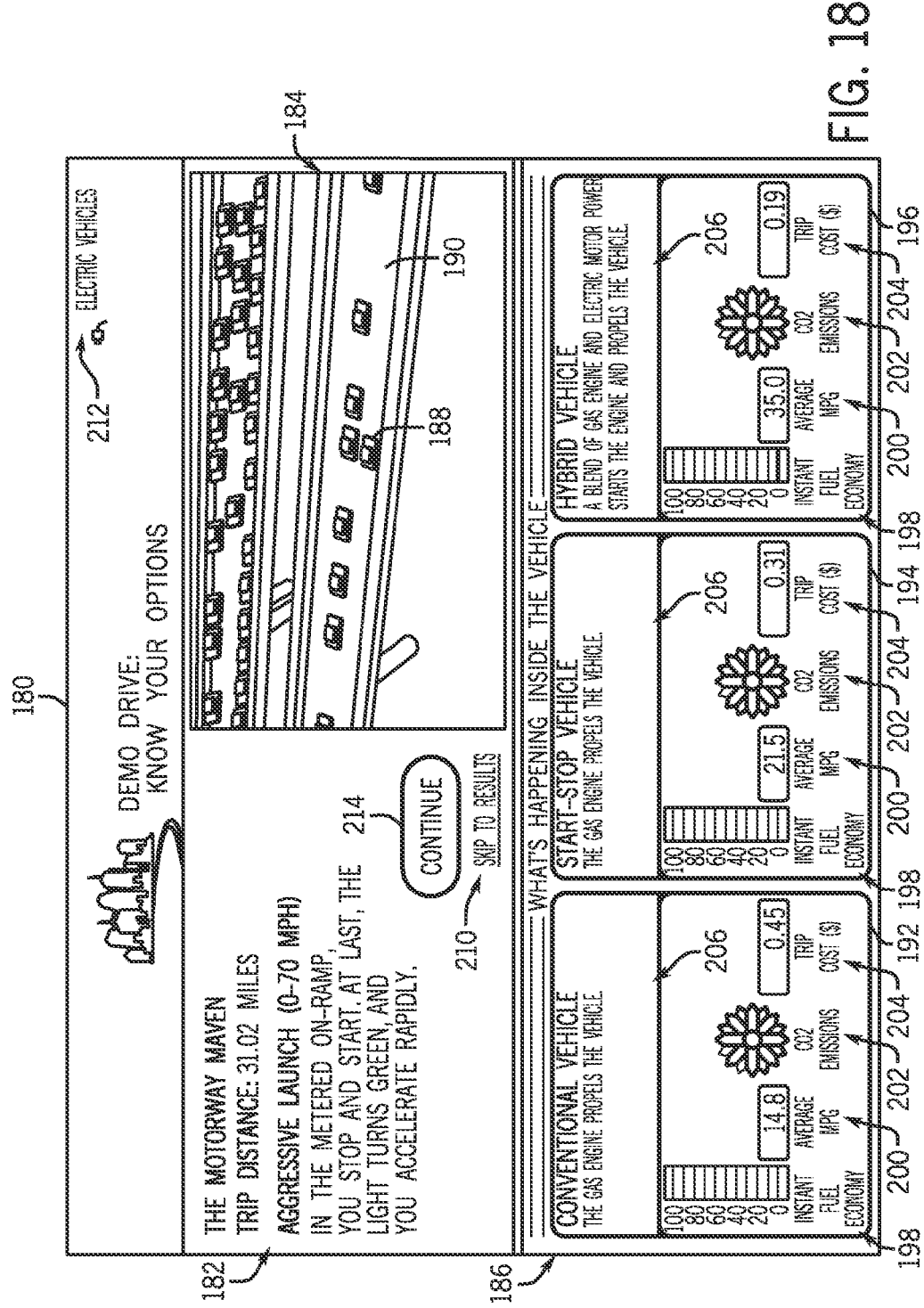

Upon again selecting the button 214, the animation 184 continues with the vehicle 188 getting on a highway through a metered on-ramp and then accelerating quickly from zero to seventy miles per hour before reaching the next pause point depicted in FIG. 18. Additional narrative describing the animation 184 continues to be provided in the region 182, as is description of the operation of the different vehicles within the panels 192, 194, and 196.

Figure 19:
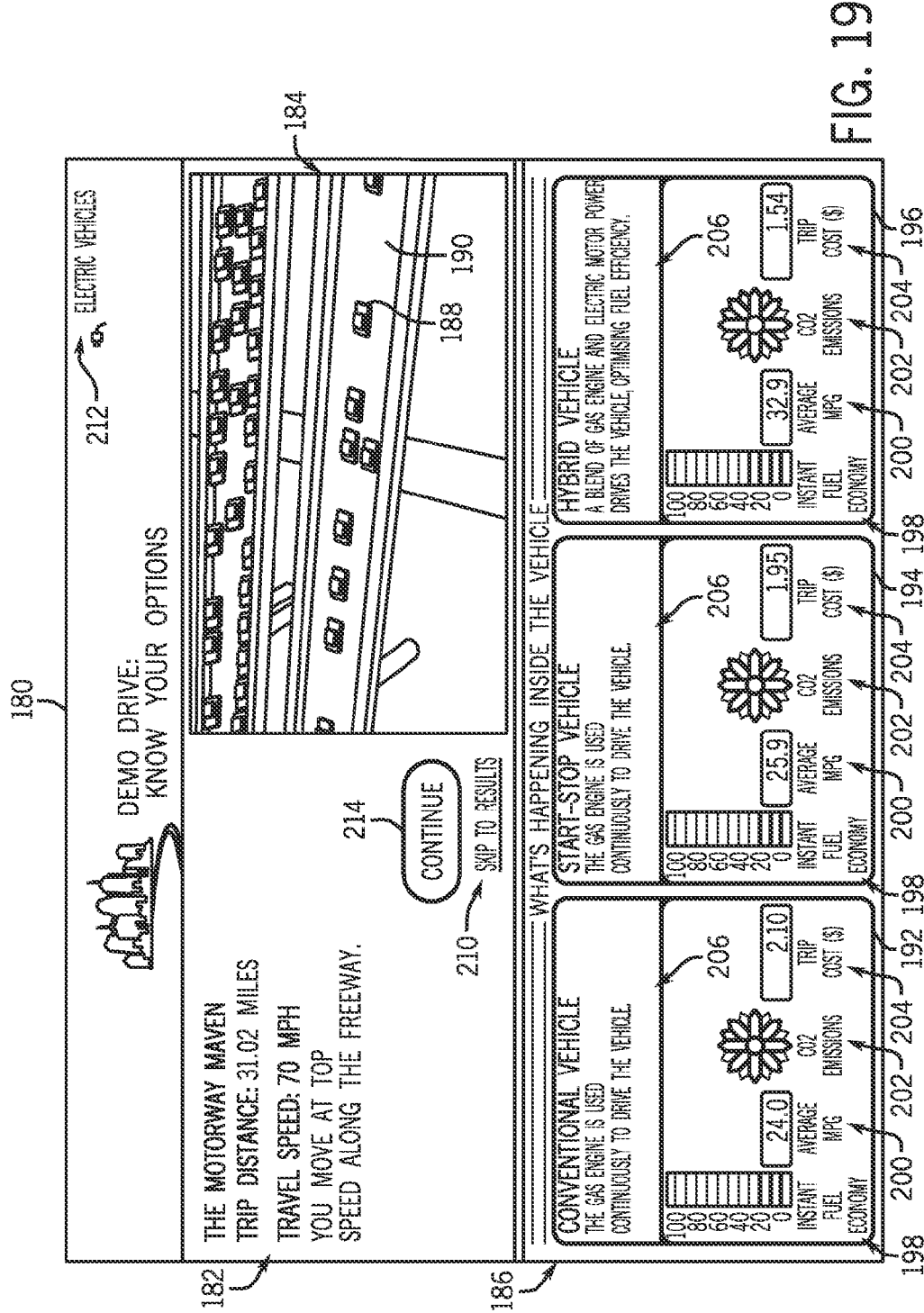
Figure 20:
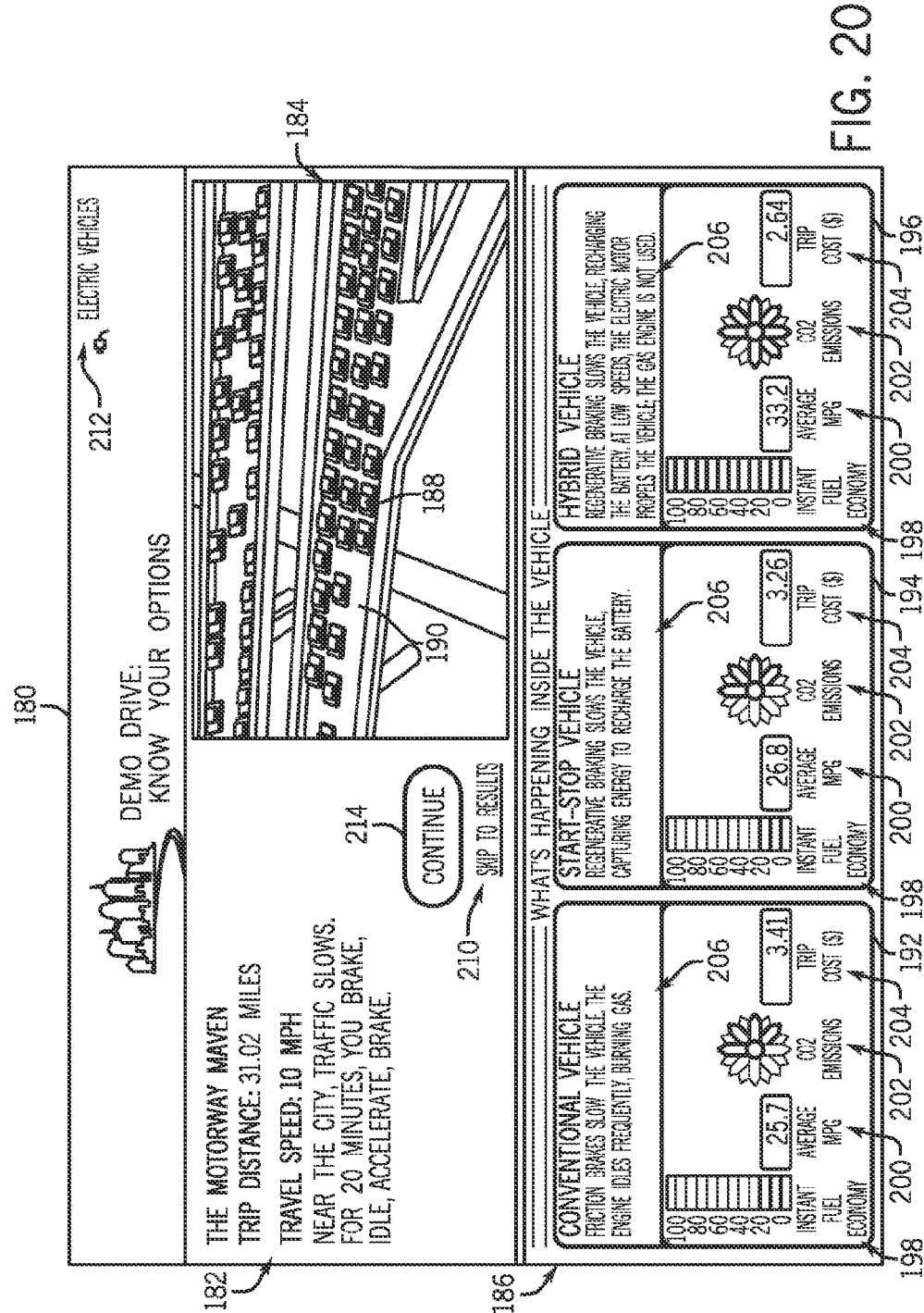

Continuing from the pause point of FIG. 18, the animation continues by showing the vehicle 188 traveling along the highway at a cruising speed (e.g., seventy miles per hour) before reaching another pause point, generally depicted in FIG. 19. Between or during the pause points (or both), additional narrative and information is provided to the user in the regions 182 and 186. The user may continue the animation by again selecting the button 214, causing the virtual test drive to continue with the animation 184 by showing the vehicle 188 encountering rush-hour, stop-and-go traffic near the city before reaching another pause point depicted in FIG. 20. The user may read the associated narrative and information from regions 182 and 186 and then continue the animation by again selecting button 214.

Figure 21:
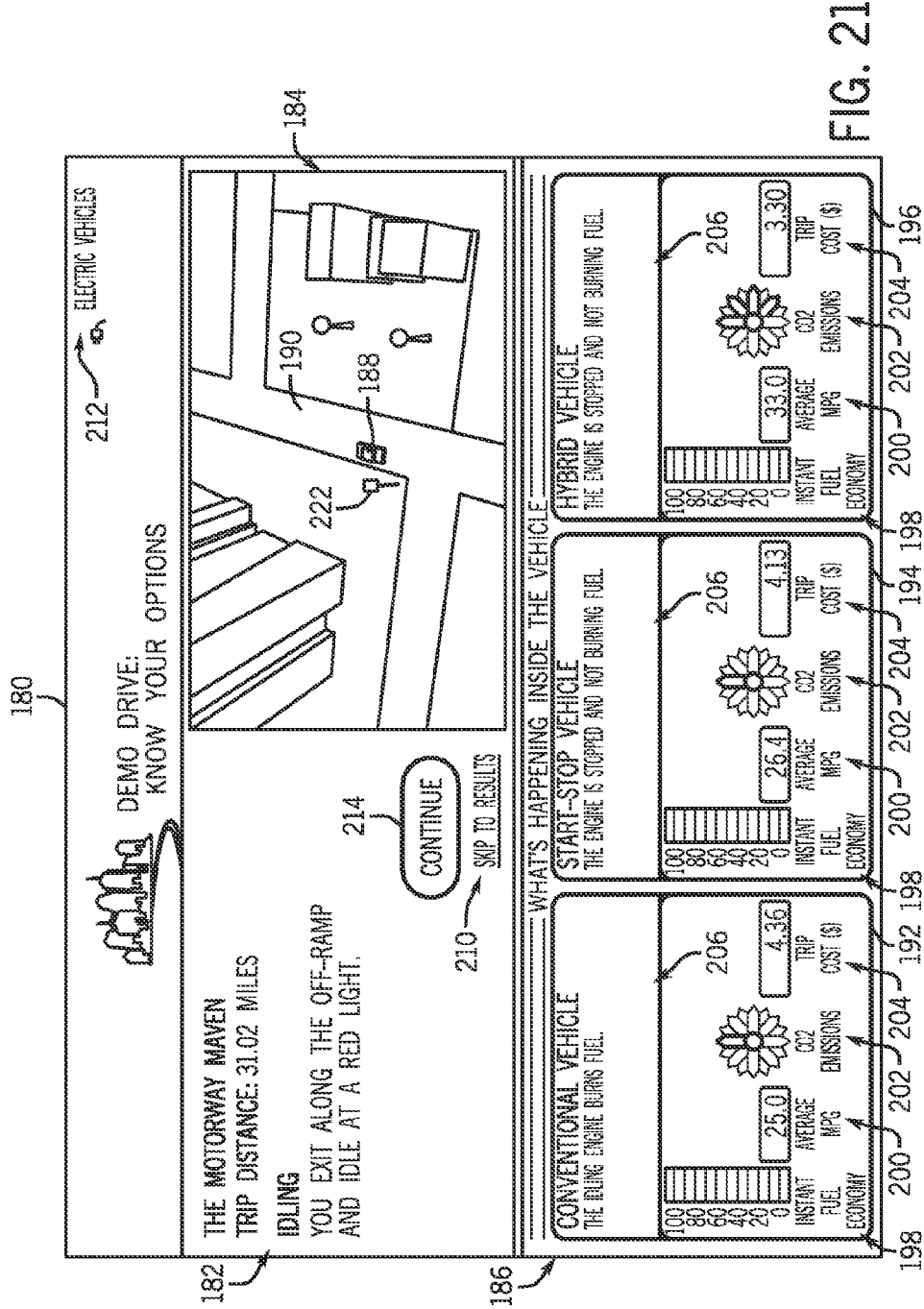
Figure 22:
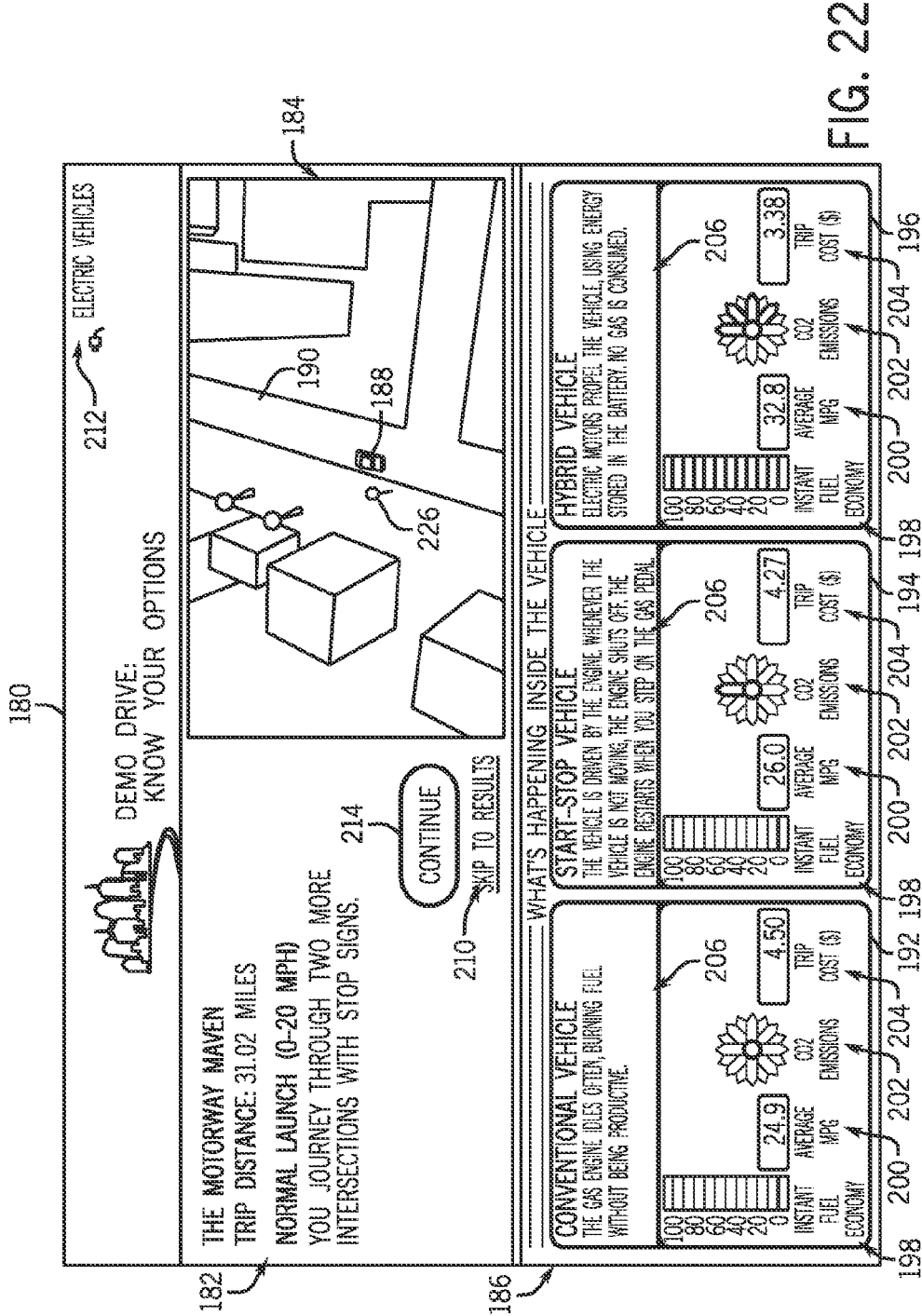
Figure 23:
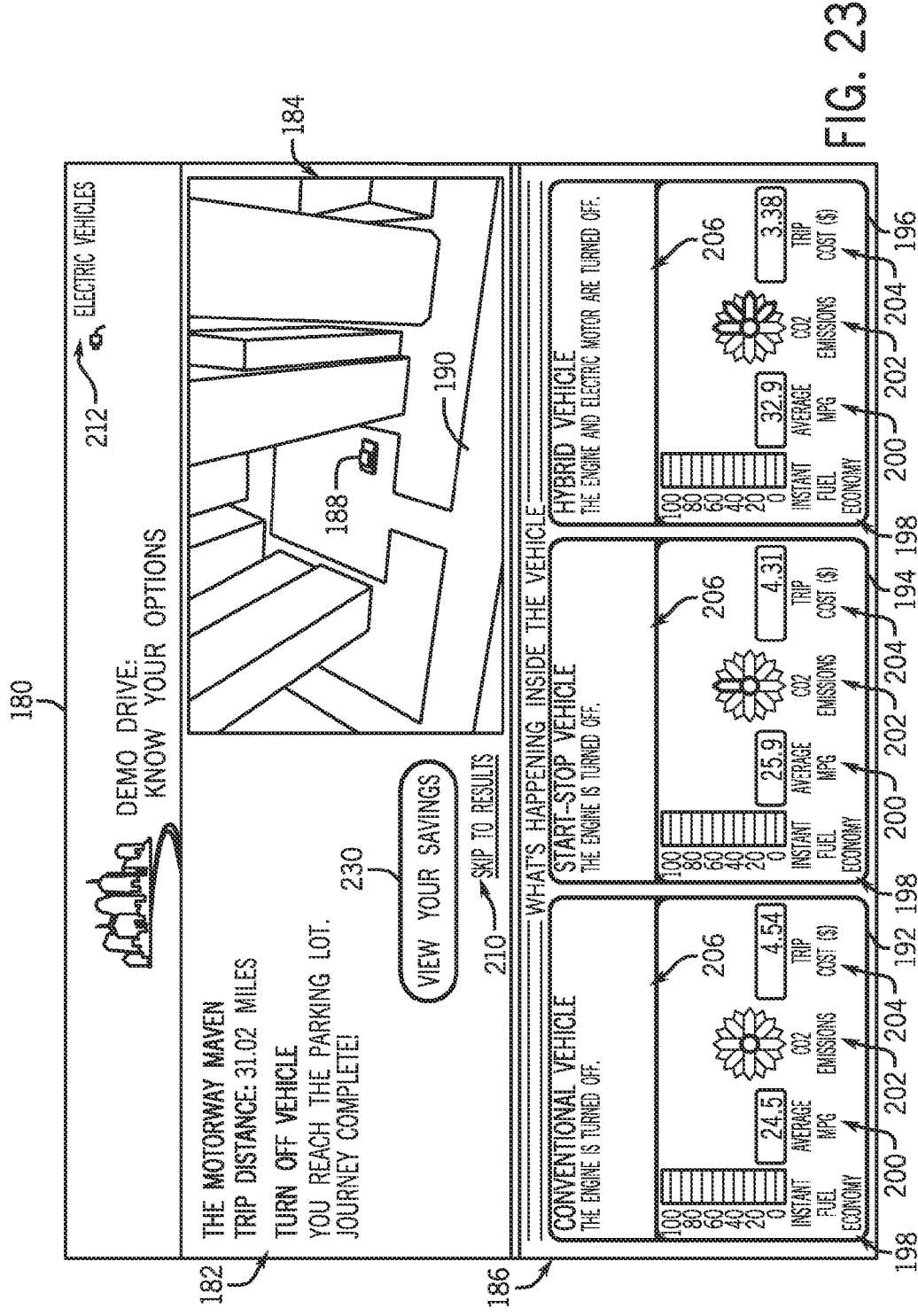

The animation 184 then proceeds to show the vehicle 188 exiting the highway and coming to a stop at a traffic light 222 before the animation 184 stops again at a pause point generally represented in FIG. 21. As before, the user may continue to read information in the regions 182 and 186 during the animation (i.e., during or between the pause points). Also, the user may again select the continue button 214 and the animation 184 will continue by showing the vehicle 188 travel roadways 190 through additional intersections and stops (e.g., at stop sign 226) before the animation 184 pauses again as generally depicted in FIG. 22. Upon another selection of the continue button 214, the animation 184 will again continue by depicting the vehicle 188 traveling down the roadway into a parking lot and coming to a stop corresponding to the final pause point, as generally depicted in FIG. 23. The user may then select the button 230 to view a page 240 summarizing differences between the vehicles compared for the virtual test drive.

Figure 24:

As depicted in the illustrated embodiment of FIG. 24, the page 240 may include a panel 242 comparing carbon dioxide emissions of the different vehicles, a panel 244 comparing fuel costs or savings for the different vehicles, and a panel 246 comparing cost of ownership differences for the vehicles. Information about the comparisons in each panel may be viewed by selecting the respective information button 248. While certain panels 242, 244, and 246 are provided in page 240 in the presently illustrated embodiment, it will be appreciated that other embodiments may include other or different comparisons of interest for the different vehicles and are not limited to those presently depicted. Further, the depicted panels 242, 244, and 246 generally represent the conventional vehicle as a base for comparison to the start-stop vehicle and the hybrid vehicle. Particularly, the panel 242 depicts carbon dioxide emissions savings of the start-stop vehicle and the hybrid vehicle compared to the conventional vehicle, while panel 244 depicts expected fuel savings for the start-stop vehicle and the hybrid vehicle compared to the conventional vehicle. These savings may be based on certain assumptions, such as the amount of miles driven and the price of fuel. The panel 246 compares the amount of time it would take for the fuel savings to equal any additional costs associated with the start-stop vehicle and hybrid vehicle when compared to the conventional vehicle. The page 240, or any other page, may include additional buttons to navigate to further pages. For instance, the page 240 includes a button 250 to visit a corporate website, a button 252 to start the virtual test drive again, a button 254 to invite another user to try the virtual vehicle comparison tool, and a one or more buttons for linking to a social media site (e.g., button 256 linking to FACEBOOK®).

Although FIGS. 5-24 include specific examples of one embodiment, it will be appreciated that the vehicle comparison tool 46 may include any number of additional functionalities and pages in other embodiments. For example, the vehicle comparison tool 46 may provide a user with questions for a dealership when shopping for a vehicle or allow for dialog between the user and the dealership. Further, the vehicle comparison tool 46 may allow the user to subscribe to an RSS (Really Simple Syndication) feed for information on different vehicles and technologies.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system comprising:
    a memory device having a plurality of routines non-transitorily stored therein;
    a processor configured to execute the plurality of routines stored in the memory device, the plurality of routines comprising:
        a routine configured to receive selection of a driving style by a user;
        a routine configured to select a virtual test drive from a plurality of virtual test drives based on the received selection of the driving style by the user;
        a routine configured to output an animation depicting the selected virtual test drive as a vehicle navigating a route; and
        a routine configured to output, simultaneously with the output of the animation, a comparison of a plurality of virtual vehicles that includes information about simulated operations of the plurality of virtual vehicles navigating the route depicted in the animation.

2. The system of claim 1, wherein each of the plurality of virtual vehicles has a different powertrain.

3. The system of claim 2, wherein the different powertrain comprises a hybrid powertrain having both an internal combustion engine and an electric motor or a non-hybrid powertrain including an internal combustion engine without an electric motor.

4. The system of claim 1, wherein the comparison of the plurality of virtual vehicles includes descriptive text comparing the simulated operations of the plurality of virtual vehicles during the virtual test drive.

5. The system of claim 4, wherein the animation includes a plurality of pauses that occur between portions of the animation to facilitate reading of the descriptive text by the user.

6. The system of claim 1, comprising a network device configured to facilitate receipt of the selection of the driving style, output of the animation depicting the selected virtual test drive, and output of the comparison of the plurality of virtual vehicles by enabling communications between the system and a user terminal via the Internet.

7. The system of claim 1, comprising a server including the memory device and the processor and configured to communicate with a user terminal via a network.

8. The system of claim 1, comprising a user terminal including the memory device, the processor, and a display that enables the selected virtual test drive to be shown to a user.

9. The system of claim 1, wherein the routine configured to output the comparison of the plurality of virtual vehicles is further configured to output an estimate of a fuel consumption characteristic for the plurality of virtual vehicles.

10. The system of claim 1, wherein the routine configured to output the comparison of the plurality of virtual vehicles is further configured to output an estimate of fuel savings for at least one of a start-stop vehicle, a hybrid vehicle, or a vehicle without an internal combustion engine in comparison to a conventional vehicle.

11. The system of claim 1, wherein the routine configured to output the comparison of the plurality of virtual vehicles is further configured to output a comparison of carbon dioxide emissions for the plurality of virtual vehicles.

12. The system of claim 1, wherein the routine configured to output the comparison of the plurality of virtual vehicles is further configured to output a comparison of cost of ownership between a conventional vehicle and at least one of a start-stop vehicle, a hybrid vehicle, or a vehicle without an internal combustion engine.

13. The system of claim 12, wherein the comparison of cost of ownership comprises an estimated point in time at which an additional purchase cost of the start-stop vehicle, the hybrid vehicle, or the vehicle without an internal combustion engine relative to the conventional vehicle approximately equals a fuel cost savings provided by the start-stop vehicle, the hybrid vehicle, or the vehicle without an internal combustion engine relative to the conventional vehicle.

\* \* \* \* \*